US007368746B2

(12) United States Patent
Fukui et al.

(10) Patent No.: US 7,368,746 B2

(45) Date of Patent: May 6, 2008

(54) PHOSPHOR PANEL

(75) Inventors: Shinichiro Fukui, Kaisei-machi (JP); Takeo Kido, Odawara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 11/882,799

(22) Filed: Aug. 6, 2007

(65) Prior Publication Data

US 2007/0290146 A1 Dec. 20, 2007

Related U.S. Application Data

(63) Continuation of application No. 10/637,013, filed on Aug. 8, 2003, now Pat. No. 7,315,031.

(30) Foreign Application Priority Data

Aug. 14, 2002 (JP) ............................ 2002/236546
Aug. 27, 2002 (JP) ............................ 2002/246974

(51) Int. Cl.
*G01N 23/04* (2006.01)
*H05B 33/00* (2006.01)

(52) U.S. Cl. .................... 250/581; 250/484.4; 250/580

(58) Field of Classification Search ................ 250/581, 250/580, 484.4, 582, 584, 583, 585, 488.1, 250/487.1, 589
See application file for complete search history.

(56) References Cited

U.S. PATENT DOCUMENTS 4,741,993 A 5/1988 Kano et al.
4,896,043 A 1/1990 Arakawa et al.
4,944,026 A 7/1990 Arakawa et al.
6,262,424 B1 7/2001 Yanagita et al.
6,359,285 B1 3/2002 Tasaki et al.
6,507,037 B2 1/2003 Kohda
6,707,057 B2 3/2004 Cresens et al.
6,710,356 B2 3/2004 Leblans et al.
6,740,897 B2 5/2004 Hosoi
6,784,448 B2 8/2004 Neriishi et al.
6,815,692 B2 11/2004 Iwabuchi et al.
2004/0016890 A1 1/2004 Maezawa et al.

FOREIGN PATENT DOCUMENTS

JP 62-209400 9/1987
JP 1-131496 A 5/1989
JP 2-036400 A1 2/1990

(Continued)

*Primary Examiner*—Dave Porta
*Assistant Examiner*—Faye Boosalis
(74) *Attorney, Agent, or Firm*—Sughrue Mion, PLLC

(57) ABSTRACT

A first radiation image storage panel comprises a stimulable phosphor layer, and a transparent protective film, which comprises at least one layer of a water vapor proof film, the water vapor proof film comprising a base material film and a transparent inorganic layer overlaid on the base material film. The transparent protective film is located such that the transparent inorganic layer of the water vapor proof film stands facing the stimulable phosphor layer, and the stimulable phosphor layer is sealed. In a second radiation image storage panel, a protective layer comprises a fundamental inorganic layer and at least one layer of a high-order inorganic layer, which is located on the fundamental inorganic layer, and each high-order inorganic layer is overlaid directly upon an inorganic layer, which is located under each high-order inorganic layer.

16 Claims, 6 Drawing Sheets

FOREIGN PATENT DOCUMENTS

| | | | |
|---|---|---|---|
| JP | 4-76440 | B2 | 12/1992 |
| JP | 10-12376 | A | 1/1998 |
| JP | 2829607 | B2 | 9/1998 |
| JP | 2843998 | B2 | 10/1998 |
| JP | 2886165 | B2 | 2/1999 |
| JP | 11-344598 | A | 12/1999 |
| JP | 2002-071899 | | 3/2002 |
| JP | 2002-107495 | | 4/2002 |
| JP | 2002-139599 | A | 5/2005 |

PHOSPHOR PANEL

CROSS-REFERENCE TO RELATED APPLICATIONS

This application is a Continuation of U.S. application Ser. No. 10/637,013 filed Aug. 8, 2003, now U.S. Pat. No. 7,315,031 the above-noted application incorporated herein by reference in its entirety.

BACKGROUND OF THE INVENTION

1. Field of the Invention

This invention relates to a radiation image storage panel for use in radiation image recording and reproducing techniques, in which stimulable phosphors are utilized.

2. Description of the Related Art

In lieu of conventional radiography, radiation image recording and reproducing techniques utilizing stimulable phosphors have heretofore been used in practice. The radiation image recording and reproducing techniques are described in, for example, U.S. Pat. No. 4,239,968. The radiation image recording and reproducing techniques utilize a radiation image storage panel (referred to also as the stimulable phosphor sheet) provided with a stimulable phosphor. With the radiation image recording and reproducing techniques, the stimulable phosphor of the radiation image storage panel is caused to absorb radiation, which carries image information of an object or which has been radiated out from a sample, and thereafter the stimulable phosphor is exposed to an electromagnetic wave (stimulating rays), such as visible light or infrared rays, which causes the stimulable phosphor to produce the fluorescence (i.e., to emit light) in proportion to the amount of energy stored thereon during its exposure to the radiation. The produced fluorescence (i.e., the emitted light) is photoelectrically detected to obtain an electric signal. The electric signal is then processed, and the processed electric signal is utilized for reproducing a visible image of the object or the sample. The radiation image storage panel, from which the electric signal has been obtained, is subjected to an erasing operation for erasing energy remaining on the radiation image storage panel, and the erased radiation image storage panel is utilized again for the image recording. Specifically, the radiation image storage panel is used repeatedly.

The radiation image recording and reproducing techniques have the advantages in that a radiation image containing a large amount of information is capable of being obtained with a markedly lower dose of radiation than in the conventional radiography utilizing a radiation film and an intensifying screen. Also, with the conventional radiography, the radiation film is capable of being used only for one recording operation. However, with the radiation image recording and reproducing techniques, the radiation image storage panel is used repeatedly. Therefore, the radiation image recording and reproducing techniques are advantageous also from the view point of resource protection and economic efficiency.

As described above, the radiation image recording and reproducing techniques are advantageous techniques for forming images. As in the cases of the intensifying screens utilized in the conventional radiography, it is desired that the radiation image storage panels utilized in the radiation image recording and reproducing techniques have the performance, such that the radiation image storage panels have a high sensitivity, yield good image quality, and endure a long period of use without the image quality of the radiation images becoming bad.

However, the stimulable phosphors utilized for the production of the radiation image storage panels ordinarily have high levels of water vapor absorbing characteristics and absorb moisture contained in air when being left within a room under ordinary weather conditions. Therefore, the stimulable phosphors have the problems in that the sensitivity of the stimulable phosphors with respect to the radiation becomes low as the amount of moisture absorbed by the stimulable phosphors becomes large, and the characteristics of the stimulable phosphors deteriorate markedly with the passage of time.

Also, ordinarily, latent images of the radiation images having been recorded on the stimulable phosphors have the properties such that the latent images fade with the passage of time after the stimulable phosphors have been exposed to the radiation. Therefore, as the time occurring between when the stimulable phosphors are exposed to the radiation and when the stimulable phosphors are exposed to the stimulating rays becomes long, the intensities of the radiation image signals detected from the stimulable phosphors become low. In cases where the stimulable phosphors absorb water vapor, the rate of the fading of the latent images having been recorded on the stimulable phosphors becomes high. Therefore, in cases where the radiation image storage panels, whose stimulable phosphors have absorbed water vapor, are used, there has arisen a tendency toward low reproducibility of the image signals at the time of the readout of the radiation images.

In order for the deterioration phenomenon of the stimulable phosphors due to water vapor absorption to be eliminated, there have heretofore been proposed techniques, wherein a stimulable phosphor layer is sealed with a plastic protective film. The techniques, wherein a stimulable phosphor layer is sealed with a plastic protective film, are proposed in, for example, Japanese Patent Nos. 2843998, 2886165, and 2829607. The techniques for sealing with the plastic protective film have the advantages in that, for example, the plastic protective film is lighter in weight than a glass protective film and absorbs less of X-rays than the glass protective film. However, the techniques for sealing with the plastic protective film have the problems in that the plastic protective film exhibits a water vapor transmission rate higher than the water vapor transmission rate of the glass protective film, and deterioration of the stimulable phosphor is apt to occur more quickly than with the technique for sealing with the glass protective film. Also, in cases where a casting polypropylene (CPP), or the like, is subjected to heat fusion bonding, and a plastic protective film is thereby formed, since the CPP is thick, the thickness of the protective film as a whole is apt to become large, and the problems occur in that the light emitted by the stimulable phosphor spreads, and the obtained image becomes unsharp. Further, since the radiation image storage panel is used repeatedly as described above, from the viewpoint of prevention of image deterioration, it is necessary for the problems to be prevented from occurring in that the surface of the protective layer is scratched due to contact with a mechanical part, such as a conveying roller.

Also, in order for the deterioration phenomenon of the stimulable phosphors due to water vapor absorption to be eliminated, for example, there has heretofore been employed a technique, wherein a stimulable phosphor is covered with a film of a polytrifluorochloroethylene, or the like, acting as a water vapor proof protective layer having a low water vapor transmission rate, and the amount of moisture reaching the stimulable phosphor layer is thus reduced. However, the aforesaid technique for eliminating the deterioration phenomenon of the stimulable phosphors due to moisture absorption has the problems in that the cost of the aforesaid film of the polytrifluorochloroethylene, or the like, is high, and the thickness of the film is large. The aforesaid technique for eliminating the deterioration phenomenon of the stimulable phosphors due to moisture absorption also has the problems in that the film of the polytrifluorochloroethylene, or the like, is produced by use of Freon as a raw material, and therefore causes environmental pollution to occur.

Further, a constitution comprising two kinds of protective layers having different levels of water vapor absorbing characteristics, wherein one protective layer having a higher level of water vapor absorbing characteristics than the water vapor absorbing characteristics of the other protective layer is located on the side of a phosphor layer, is described in, for example, Japanese Patent Publication No. 4(1992)-76440. Furthermore, a constitution, wherein a protective layer contains a silicon compound containing nitrogen and oxygen, is described in, for example, Japanese Patent No. 1927597. However, water vapor proof characteristics, which are achieved by each of the constitutions described above, are not necessarily of a satisfactory level. Also, a technique for utilizing a laminated film for an electric field fluorescent lamp, wherein the laminated film is formed by laminating two to eight films, each of which has been prepared by forming a thin layer of a metal oxide, silicon nitride, or the like, on a polyethyleneterephthalate (PET) film with vacuum evaporation, is described in, for example, Japanese Unexamined Patent Publication No. 10(1998)-12376. However, with the laminated film described above, the problems with regard to image defects due to the water vapor proof protective film, image defects due to a condition of adhesion between the water vapor proof protective film and a phosphor surface, and the like, occur. Therefore, the laminated film described above cannot be employed as a water vapor proof protective film for the radiation image storage panels, which are exclusively used for obtaining medical images for making a diagnosis of an illness.

Further, as a constitution for used in a radiation image storage panel, a constitution, wherein a laminated film comprising a plurality of resin films, which contain at least one metal oxide evaporated resin film and have been adhered to one another in a layer form, is located on the side of a phosphor layer surface, is proposed in, for example, Japanese Unexamined Patent Publication No. 11(1999)-344598. However, with the proposed constitution, wherein the laminated film is adhered by an adhesive layer to the phosphor layer surface, the problems occur in that nonuniformity occurs with images, depending upon the condition of the adhesion of the laminated film. Also, with the proposed constitution, the problems occur in that the thickness of the entire water vapor proof layer becomes large, and the image quality becomes bad.

SUMMARY OF THE INVENTION

The primary object of the present invention is to provide a radiation image storage panel, which has good water vapor proof characteristics and a high durability, which is capable of being used in good conditions for a long period of time, and which has a high sensitivity and is capable of yielding good image quality.

The present invention provides a first radiation image storage panel, comprising:

i) a stimulable phosphor layer, and ii) a transparent protective film, which comprises at least one layer of a water vapor proof film, the water vapor proof film comprising a base material film and a transparent inorganic layer overlaid on the base material film, wherein the transparent protective film is located such that the transparent inorganic layer of the water vapor proof film stands facing the stimulable phosphor layer, and the stimulable phosphor layer is sealed.

The first radiation image storage panel in accordance with the present invention should preferably be modified such that the transparent protective film comprises at least two layers of the water vapor proof films, which are overlaid one upon the other, and the water vapor proof films, which are adjacent to each other, are located such that the transparent inorganic layer of one of the water vapor proof films is overlaid on a surface of the base material film of the other water vapor proof film.

Also, the first radiation image storage panel in accordance with the present invention may be modified such that the stimulable phosphor layer is formed on a substrate, and the transparent protective film is adhered to a surface of the substrate, which surface is opposite to the substrate surface provided with the stimulable phosphor layer.

Further, the first radiation image storage panel in accordance with the present invention should preferably be modified such that the transparent inorganic layer contains a compound selected from the group consisting of a metal oxide, a metal nitride, and a metal oxynitride.

Furthermore, the first radiation image storage panel in accordance with the present invention should preferably be modified such that the transparent protective film has a film thickness of at most 50 μm.

Also, the first radiation image storage panel in accordance with the present invention should preferably be modified such that the sealing is performed with adhesion of the transparent protective film by use of a resin, which is capable of being cured at a temperature lower than 100° C. In such cases, the resin should preferably have a water vapor transmission coefficient of at most 50 g·mm/($m^2$·d).

The present invention also provides a second radiation image storage panel, comprising:

i) a stimulable phosphor layer, and ii) a protective layer, which is overlaid on the stimulable phosphor layer, wherein the protective layer comprises a fundamental inorganic layer and at least one layer of a high-order inorganic layer, which is located on the fundamental inorganic layer, and each high-order inorganic layer is overlaid directly upon an inorganic layer, which is located under each high-order inorganic layer.

The expression of "each high-order inorganic layer is overlaid directly upon an inorganic layer" as used herein means that the inorganic layers are in close contact with each other by being formed with a dry process technique, such as a sputtering technique, a physical vapor deposition (PVD) technique, or a chemical vapor deposition (CVD) technique, or a wet process technique, such as a sol-gel technique, and are not adhered to each other with an adhesive layer, or the like.

As described above, in the second radiation image storage panel in accordance with the present invention, the protective layer comprises the fundamental inorganic layer and at least one layer of the high-order inorganic layer. The protective layer should preferably comprise the fundamental inorganic layer and at least two layers of the high-order inorganic layers. Also, the second radiation image storage panel in accordance with the present invention should preferably be modified such that at least one layer among high-order inorganic layers has a layer thickness larger than the layer thickness of the fundamental inorganic layer. In such cases, the layer thickness of the high-order inorganic layer, which has the layer thickness larger than the layer thickness of the fundamental inorganic layer, should preferably fall within the range of 20 nm to 1,000 nm. The layer thickness of the high-order inorganic layer, which has the layer thickness larger than the layer thickness of the fundamental inorganic layer, should more preferably fall within the range of 30 nm to 500 nm.

Also, the second radiation image storage panel in accordance with the present invention should preferably be modified such that at least one set of inorganic layers, which are among the fundamental inorganic layer and high-order inorganic layers and are adjacent to each other, have different crystal structures. The at least one set of the inorganic layers, which are among the fundamental inorganic layer and the high-order inorganic layers and are adjacent to each other, should preferably be the set of the high-order inorganic layer, which has the layer thickness larger than the layer thickness of the fundamental inorganic layer, and an inorganic layer, which is located under the high-order inorganic layer. Alternatively, all of the fundamental inorganic layer and the high-order inorganic layers, which constitute the protective layer, may have different crystal structures. The term “different crystal structures” as used herein includes, for example, the cases wherein the inorganic layers adjacent to each other have different compositions, and the cases wherein the inorganic layers adjacent to each other have an identical composition and are formed with different layer forming techniques or under different layer forming conditions.

Further, the second radiation image storage panel in accordance with the present invention should preferably be modified such that at least one inorganic layer, which is among the fundamental inorganic layer and high-order inorganic layers, contains a compound selected from the group consisting of a metal oxide, a metal nitride, and a metal oxynitride. In cases where all of the fundamental inorganic layer and the high-order inorganic layers contain the compound selected from the group consisting of the metal oxide, the metal nitride, and the metal oxynitride, the protective layer may also contain other inorganic layers. Also, the fundamental inorganic layer and the high-order inorganic layers may consist of only the compound selected from the group consisting of the metal oxide, the metal nitride, and the metal oxynitride. Alternatively, the fundamental inorganic layer and the high-order inorganic layers may contain a combination of the metal oxide and the metal nitride. As another alternative, the fundamental inorganic layer and the high-order inorganic layers may contain a combination of the metal nitride and the metal oxynitride. As a further alternative, the fundamental inorganic layer and the high-order inorganic layers may contain a combination of the metal oxide and the metal oxynitride. As a still further alternative, the fundamental inorganic layer and the high-order inorganic layers may contain a combination of the metal oxide, the metal nitride, and the metal oxynitride.

Furthermore, the second radiation image storage panel in accordance with the present invention should preferably be modified such that three inorganic layers of the protective layer, which inorganic layers are adjacent to one another, are constituted of an aluminum oxide layer, a silicon oxide layer, and an aluminum oxide layer, which are overlaid in this order.

Also, the second radiation image storage panel in accordance with the present invention should preferably be modified such that the protective layer has a layer thickness of at most 50 μm and a water vapor transmission rate of at most 0.07 $g/m^2/24$ h at 40° C.

Further, the second radiation image storage panel in accordance with the present invention should preferably be modified such that the protective layer comprises a base material layer, on which the fundamental inorganic layer is overlaid directly, and the base material layer has a glass transition temperature (Tg) of at least 85° C.

In such cases, the base material layer should preferably have a glass transition temperature (Tg) of at least 100° C. In cases where the protective layer comprises a plurality of the base material layers, at least one of the base material layer among the plurality of the base material layers should preferably have a glass transition temperature of at least 85° C., and should more preferably have a glass transition temperature of at least 100° C. Also, all of the plurality of the base material layers should particularly preferably have a glass transition temperature of at least 85° C., and should most preferably have a glass transition temperature of at least 100° C.

With the first radiation image storage panel in accordance with the present invention, the transparent protective film comprises at least one layer of the water vapor proof film, which comprises the base material film and the transparent inorganic layer overlaid on the base material film, and the transparent protective film is located such that the transparent inorganic layer of the water vapor proof film stands facing the stimulable phosphor layer. Therefore, the base material film covers the surface of the radiation image storage panel, and anti-scratching characteristics of the radiation image storage panel are thus capable of being enhanced. Also, with the first radiation image storage panel in accordance with the present invention, wherein the stimulable phosphor layer is sealed, the radiation image storage panel is capable of having good water vapor proof characteristics and good durability. Further, as described above, in cases where the CPP is subjected to heat fusion bonding, and a protective film is thereby formed as in the conventional technique, the thickness of the protective film as a whole is apt to become large, and the problems occur in that the light emitted by the stimulable phosphor spreads, and the obtained image becomes unsharp. However, with the first radiation image storage panel in accordance with the present invention, wherein the stimulable phosphor layer is sealed, the CPP need not be utilized, and the protective film is capable of being kept thin. Therefore, the first radiation image storage panel in accordance with the present invention is capable of having a high sensitivity and yielding an image having good image quality.

With the first radiation image storage panel in accordance with the present invention, wherein the stimulable phosphor layer is formed on the substrate, and the transparent protective film is adhered to the surface of the substrate, which surface is opposite to the substrate surface provided with the stimulable phosphor layer, water vapor absorption from the side faces of the stimulable phosphor layer is capable of being more efficiently prevented from occurring. Therefore, the water vapor proof characteristics and the durability of the radiation image storage panel are capable of being enhanced even further.

With the first radiation image storage panel in accordance with the present invention, wherein the transparent inorganic layer contains the compound selected from the group consisting of the metal oxide, the metal nitride, and the metal oxynitride, it is capable of being expected that the water vapor proof characteristics of the radiation image storage panel is enhanced even further.

With the first radiation image storage panel in accordance with the present invention, wherein the entire transparent protective film has a film thickness of at most 50 μm, the problems are capable of being prevented from occurring in that the light, which is emitted by the stimulable phosphor layer when the stimulable phosphor layer is exposed to stimulating rays, spreads within the transparent protective film. Therefore, the first radiation image storage panel in accordance with the present invention is capable of having a high sensitivity and yielding an image having good image quality.

With the first radiation image storage panel in accordance with the present invention, wherein the sealing is performed with the adhesion of the transparent protective film by use of the resin, which is capable of being cured at a temperature lower than 100° C., the water vapor proof characteristics and the durability of the radiation image storage panel are capable of being enhanced even further. Also, deterioration of the water vapor proof characteristics occurring at the time of the formation of the transparent protective film is capable of being suppressed.

The second radiation image storage panel in accordance with the present invention comprises the stimulable phosphor layer and the protective layer overlaid on the stimulable phosphor layer. The second radiation image storage panel in accordance with the present invention is constituted such that the protective layer comprises the fundamental inorganic layer and at least one layer of the high-order inorganic layer, which is located on the fundamental inorganic layer, and such that each high-order inorganic layer is overlaid directly upon the inorganic layer, which is located under each high-order inorganic layer. Therefore, the second radiation image storage panel in accordance with the present invention is capable of having good water vapor proof characteristics and good durability. Also, if inorganic layers are adhered to each other by use of an adhesive agent, image nonuniformity will occur due to adhering conditions. However, with the second radiation image storage panel in accordance with the present invention, the inorganic layers need not be adhered to each other by use of an adhesive agent, and therefore the radiation image storage panel is capable of having a high sensitivity and yielding an image having good image quality. Further, since each high-order inorganic layer is overlaid directly upon the inorganic layer, which is located under each high-order inorganic layer, the thickness of the entire protective layer is capable of being kept thin, and an image having good image quality is capable of being obtained.

The second radiation image storage panel in accordance with the present invention may be modified such that at least one layer among the high-order inorganic layers has a layer thickness larger than the layer thickness of the fundamental inorganic layer. Also, the second radiation image storage panel in accordance with the present invention may be modified such that at least one set of inorganic layers, which are among the fundamental inorganic layer and the high-order inorganic layers and are adjacent to each other, have different crystal structures. With the modifications described above, the high-order inorganic layer is capable of efficiently compensating for crystal defects, which occur in the fundamental inorganic layer. Therefore, the water vapor proof characteristics of the radiation image storage panel are capable of being enhanced even further.

Further, the second radiation image storage panel in accordance with the present invention may be modified such that the protective layer comprises the base material layer, on which the fundamental inorganic layer is overlaid directly, and the base material layer has a glass transition temperature of at least 85° C., preferably at least 100° C. With the modification described above, the problems are capable of being prevented from occurring in that, in cases where the inorganic layer is overlaid directly on the base material layer, the water vapor proof characteristics become bad due to deterioration of the base material layer.

DESCRIPTION OF THE PREFERRED EMBODIMENTS

The present invention will hereinbelow be described in further detail with reference to the accompanying drawings.

Embodiments of the first radiation image storage panel in accordance with the present invention will be described hereinbelow.

Figure 1:
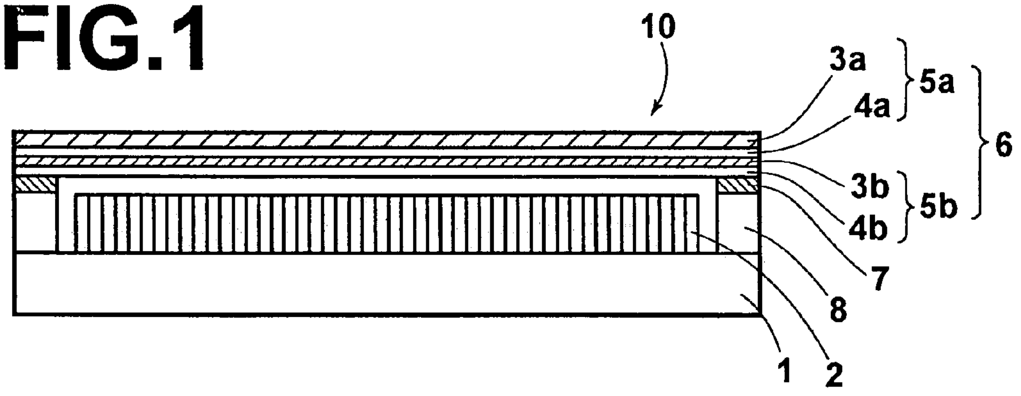
FIG. 1 is a schematic sectional view showing a first embodiment of the radiation image storage panel in accordance with the present invention.

With reference to FIG. 1, a radiation image storage panel 10 comprises a substrate 1, a stimulable phosphor layer 2, which is overlaid on the substrate 1, and a transparent protective film 6. The transparent protective film 6 comprises a water vapor proof film 5*a* and a water vapor proof film 5*b*. The water vapor proof film 5*a* comprises a base material film 3*a* and a transparent inorganic layer 4*a* overlaid on the base material film 3*a*. The water vapor proof film 5*b* comprises a base material film 3*b* and a transparent inorganic layer 4*b* overlaid on the base material film 3*b*. The transparent protective film 6 is located such that the transparent inorganic layer 4*b* of the water vapor proof film 5*b* stands facing the stimulable phosphor layer 2. Also, a sealing frame 8 is formed on the substrate 1, such that the sealing frame 8 surrounds the stimulable phosphor layer 2. The transparent protective film 6 is adhered to the sealing frame 8 by use of an adhesive agent 7, and the stimulable phosphor layer 2 is thereby sealed. In the embodiment of FIG. 1, the transparent protective film 6 is constituted of the two water vapor proof films 5*a* and 5*b*. Alternatively, the transparent protective film may be constituted of only one water vapor proof film. As another alternative, the transparent protective film may be constituted of three or more water vapor proof films.

As illustrated in FIG. 1, the outermost layer of the transparent protective film should preferably be the base material film. The anti-scratching characteristics of the transparent inorganic layer is comparatively bad. Therefore, if the outermost layer of the transparent protective film is constituted of the transparent inorganic layer, the outermost layer of the transparent protective film will be apt to suffer from scratching due to contact with a mechanical part, such as a conveying roller. However, in cases where the outermost layer of the transparent protective film is constituted of the base material film, the radiation image storage panel is capable of having good anti-scratching characteristics.

In cases where the transparent protective film comprises at least two water vapor proof films, as illustrated in FIG. 1, the water vapor proof film 5*a* and the water vapor proof film 5*b*, which are adjacent to each other, should preferably be located such that the transparent inorganic layer 4*a* of the water vapor proof film 5*a* and the base material film 3*b* of the water vapor proof film 5*b* stand facing each other. If the water vapor proof film 5*a* and the water vapor proof film 5*b*, which are adjacent to each other, are located such that the transparent inorganic layer 4*a* of the water vapor proof film 5*a* and the transparent inorganic layer 4*b* of the water vapor proof film 5*b* stand facing each other, the problems will occur in that optical interference is apt to occur within the transparent protective film and adversely affects the image quality of the obtained image.

In the radiation image storage panel 10 illustrated in FIG. 1, the sealing frame 8 is formed at the region of the substrate 1, which region is other than the region provided with the stimulable phosphor layer 2, and the transparent protective film 6 is adhered to the sealing frame 8 by use of the adhesive agent 7. In this manner, the stimulable phosphor layer 2 is sealed. Alternatively, as in a radiation image storage panel 20 illustrated in FIG. 2, a transparent protective film 26 may be adhered with an adhesive agent 27 to a surface of a substrate 21, which surface is opposite to the substrate surface provided with a stimulable phosphor layer 22.

Figure 3:
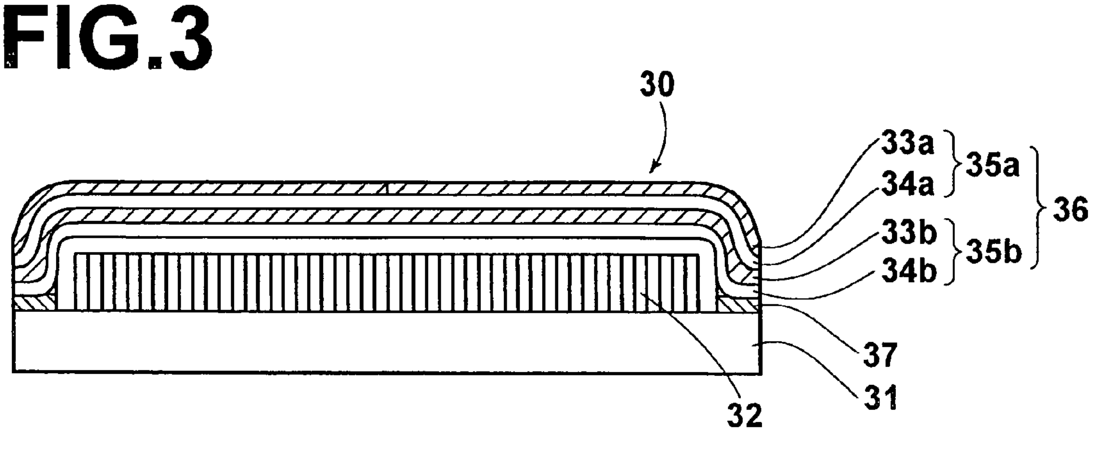
FIG. 3 is a schematic sectional view showing a third embodiment of the radiation image storage panel in accordance with the present invention.

Also, in the radiation image storage panel 10 illustrated in FIG. 1, the sealing frame 8 is formed around the stimulable phosphor layer 2. Alternatively, as in a radiation image storage panel 30 illustrated in FIG. 3, instead of a sealing frame being formed, a transparent protective film 36 may be adhered with an adhesive agent 37 directly to a surface of a substrate 31, and a stimulable phosphor layer 32 may thus be sealed. In FIG. 3, reference numerals 35*a* and 35*b* represent water vapor proof films. Reference numerals 33*a* and 33*b* represent base material films. Reference numerals 34*a* and 34*b* represents transparent inorganic layers.

Figure 2:
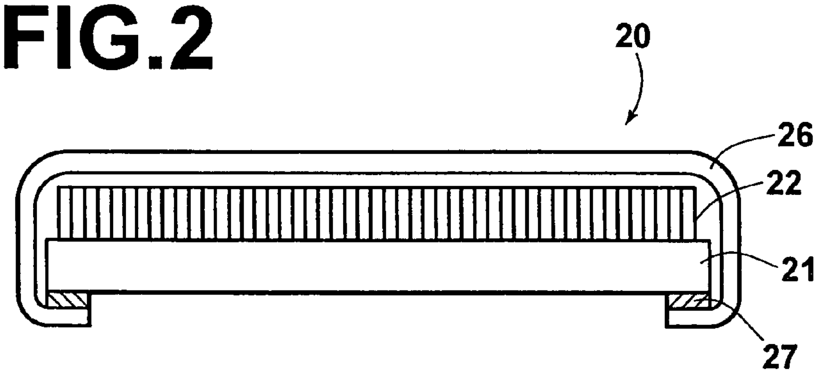
FIG. 2 is a schematic sectional view showing a second embodiment of the radiation image storage panel in accordance with the present invention.

In the embodiments of the radiation image storage panels illustrated in FIG. 1, FIG. 2, and FIG. 3, a different layer is not located between the stimulable phosphor layer and the transparent protective film. Alternatively, a different layer, such as an evaporated layer formed with a vacuum evaporation technique or a resin coating layer (a sizing agent layer, or the like), which has a thickness (approximately 2 μm to 3 μm) such that the film thickness of the entire protective film may not become large and such that the light emitted by the stimulable phosphor layer may not spread within the different layer, may be located between the stimulable phosphor layer and the aforesaid transparent protective film. The film thickness of the transparent protective film should preferably be at most 50 μm, and should more preferably be at most 30 μm.

The layers constituting the radiation image storage panel will hereinbelow be described in more detail.

The transparent inorganic layer should preferably contain a compound selected from the group consisting of a metal oxide, a metal nitride, and a metal oxynitride. More specifically, the transparent inorganic layer should preferably be a transparent evaporated layer formed with a vacuum evaporation technique utilizing an inorganic material, which exhibits no light absorption with respect to light having wavelengths falling within the range of 300 nm to 1,000 nm and has gas barrier characteristics. Examples of the inorganic materials, which exhibit no light absorption with respect to the light having wavelengths falling within the range of 300 nm to 1,000 nm, include silicon oxide, silicon nitride, aluminum oxide, aluminum nitride, zirconium oxide, tin oxide, silicon oxynitride, and aluminum oxynitride. Among the above-enumerated inorganic materials, aluminum oxide, silicon oxide, and silicon oxynitride have a high light transmittance and good gas barrier characteristics. Specifically, with aluminum oxide, silicon oxide, or silicon oxynitride, a dense film free from cracks and micropores is capable of being formed. Therefore, aluminum oxide, silicon oxide, and silicon oxynitride are more preferable as the inorganic materials. In cases where two or more water vapor proof films are overlaid on upon the other, the transparent inorganic layers of the water vapor proof films may be constituted of different materials. Alternatively, the transparent inorganic layers of the water vapor proof films may be constituted of an identical material.

The transparent inorganic layer is overlaid directly on the base material film with a vacuum deposition technique, such as a sputtering technique, a physical vapor deposition technique (i.e., the PVD technique), or a chemical vapor deposition technique (i.e., the CVD technique). With any of the above-enumerated techniques, the transparency and the barrier characteristics of the obtained transparent inorganic layer do not vary largely. Therefore, the vacuum deposition technique may be selected appropriately from the above-enumerated techniques. However, from the view point of easiness and simplicity of layer formation, the CVD technique is preferable as the vacuum deposition technique. Particularly, a plasma enhanced CVD technique (i.e., the PE-CVD technique), an ECR-PE-CVD technique, and the like, are preferable.

The base material film may be constituted of a film of a transparent high-molecular weight material. Examples of the transparent high-molecular weight materials include cellulose derivatives, such as cellulose acetate and nitrocellulose; and synthetic high-molecular weight materials, such as a polymethyl methacrylate, a polyvinyl butyral, a polyvinyl formal, a polycarbonate, a polyvinyl acetate, a vinyl chloride-vinyl acetate copolymer, a fluorine type of resin, a polyethylene, a polypropylene, a polyester, an acrylic resin, a poly-para-xylene, a polyethylene terephthalate (PET), hydrochlorinated rubber, and a vinylidene chloride copolymer.

In order for the transparent protective film to be formed, the transparent protective film may be adhered in a dry atmosphere by use of an adhesive agent so as to seal the stimulable phosphor layer. The sealing should preferably be performed under reduced pressure. In cases where the sealing is performed under reduced pressure, peeling of the transparent protective film from the stimulable phosphor layer is capable of being suppressed.

The adhesive agent for the sealing of the stimulable phosphor layer may be selected from a wide variety of adhesive agents. However, the adhesive agent should preferably be a resin, which is capable of being cured at a temperature lower than 100° C. In such cases, the resin should preferably have a water vapor transmission coefficient of at most 50 $g \cdot mm/(m^2 \cdot d)$. Examples of the adhesive agents include a vinyl type of adhesive agent, an acrylic type of adhesive agent, a polyamide type of adhesive agent, an epoxy type of adhesive agent, a rubber type of adhesive agent, and a urethane type of adhesive agent. In cases where two or more water vapor proof films are to be overlaid one upon another, the adhesive agent may also be utilized for the adhesion of the water vapor proof films.

Also, in order for water vapor absorption from side faces of the stimulable phosphor layer to be prevented sufficiently, particularly in cases where the transparent protective film is adhered with the adhesive agent to the region of the substrate, which region is other than the substrate region provided with the stimulable phosphor layer, the side faces of the radiation image storage panel should preferably be sealed with glass, an epoxy resin, a UV curing resin, or a metal (a solder). Further, in order for deterioration of performance due to water vapor absorption of the stimulable phosphor layer to be prevented from occurring, the operations ranging from the taking of the radiation image storage panel out of a vacuum evaporation tank (i.e., a vacuum evaporation machine) to the sealing of the end faces of the radiation image storage panel should preferably be performed in a vacuum, dry air, an inert gas, or a hydrophobic inert gas.

The stimulable phosphor, which constitutes the stimulable phosphor layer in the radiation image storage panel in accordance with the present invention, should preferably be, for example, a stimulable phosphor represented by Formula (I) shown below, as described in Japanese Patent Publication No. 7(1995)-84588.

$$(M_{1-f} \cdot M^I_f)X.bM^{III}X''_3{:}cA \qquad (I)$$

From the view point of the luminance of the light emitted by the stimulable phosphor, in Formula (I) shown above, $M^I$ should preferably be at least one kind of alkali metal selected from the group consisting of Rb, Cs, Cs-containing Na, and Cs-containing K, particularly at least one kind of alkali metal selected from the group consisting of Rb and Cs. Also, $M^{III}$ should preferably be at least one kind of trivalent metal selected from the group consisting of Y, La, Lu, Al, Ga, and In. Further, X" should preferably be at least one kind of halogen selected from the group consisting of F, Cl, and Br. The value of b representing the content of $M^{III}X''_3$ should preferably be selected from the range of $0 \leqq b \leqq 10^{-2}$.

Furthermore, in Formula (I) shown above, A acting as the activator should preferably be at least one kind of metal selected from the group consisting of Eu, Tb, Ce, Tm, Dy, Ho, Gd, Sm, Tl, and Na, particularly at least one kind of metal selected from the group consisting of Eu, Ce, Sm, Tl, and Na. Also, from the view point of the luminance of the light emitted by the stimulable phosphor, the value of c representing the quantity of the activator should preferably be selected from the range of $10^{-6} < c < 0.1$.

Examples of the other stimulable phosphors, which may also be employed in the radiation image storage panel in accordance with the present invention, include the following:

a phosphor represented by the formula SrS:Ce,Sm; SrS:Eu, Sm; $ThO_2$:Er; or $La_2O_2S$:Eu, Sm, as described in U.S. Pat. No. 3,859,527, a phosphor represented by the formula ZnS:Cu, Pb; $BaO.xAl_2O_3$:Eu wherein $0.8 \leqq x \leqq 10$; $M^{II}O.xSiO_2$:A wherein $M^{II}$ is Mg, Ca, Sr, Zn, Cd, or Ba, A is Ce, Tb, Eu, Tm, Pb, Tl, Bi, or Mn, and x is a number satisfying $0.5 \leqq x \leqq 2.5$; or LnOX:xA wherein Ln is at least one of La, Y, Gd, and Lu, X is at least one of Cl and Br, A is at least one of Ce and Tb, x is a number satisfying $0<x<0.1$, as disclosed in U.S. Pat. No. 4,236,078, a phosphor represented by the formula $(Ba_{1-x-y}, Mg_x, Ca_y)FX{:}aEu^{2+}$ wherein X is at least one of Cl and Br, x and y are numbers satisfying $0<x+y \leqq 0.6$ and $xy \neq 0$, and a is a number satisfying $10^{-6} \leqq a \leqq 5 \times 10^{-2}$, as disclosed in DE-OS No. 2,928,245, a phosphor represented by the formula $(Ba_{1-x}, M^{2+}_x)FX{:}yA$ wherein $M^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leqq x \leqq 0.6$, and y is a number satisfying $0 \leqq y \leqq 0.2$, as disclosed in U.S. Pat. No. 4,239,968, a phosphor represented by the formula $M^{II}FX.xA{:}yLn$ wherein $M^{II}$ is at least one of Ba, Ca, Sr, Mg, Zn, and Cd, A is at least one of Be O, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leqq x \leqq 0.5$, and y is a number satisfying $0<y \leqq 0.2$, as described in Japanese Unexamined Patent Publication No. 55(1980)-160078, a phosphor represented by the formula $(Ba_{1-x}, M^{II}_x)F_2.aBaX_2{:}yEu, zA$ wherein $M^{II}$ is at least one of beryllium, magnesium, calcium, strontium, zinc, and cadmium, X is at least one of chlorine, bromine, and iodine, A is at least one of zirconium and scandium, a is a number satisfying $0.5 \leqq a \leqq 1.25$, x is a number satisfying $0 \leqq x \leqq 1$, y is a number satisfying $10^{-6} \leqq y \leqq 2 \times 10^{-1}$, and z is a number satisfying $0<z \leqq 10^{-2}$, as described in Japanese Unexamined Patent Publication No. 56(1981)-116777, a phosphor represented by the formula $(Ba_{1-x}, M^{II}_x)F_2.aBaX_2{:}yEu, zB$ wherein $M^{II}$ is at least one of beryllium, magnesium, calcium, strontium, zinc, and cadmium, X is at least one of chlorine, bromine, and iodine, a is a number satisfying $0.5 \leqq a \leqq 1.25$, x is a number satisfying $0 \leqq x \leqq 1$, y is a number satisfying $10^{-6} \leqq y \leqq 2 \times 10^{-1}$, and z is a number satisfying $0<z \leqq 10^{-2}$, as described in Japanese Unexamined Patent Publication No. 57(1982)-23673, a phosphor represented by the formula $(Ba_{1-x}, M^{II}_x)F_2.aBaX_2{:}yEu, zA$ wherein $M^{II}$ is at least one of beryllium, magnesium, calcium, strontium, zinc, and cadmium, X is at least one of chlorine, bromine, and iodine, A is at least one of arsenic and silicon, a is a number satisfying $0.5 \leqq a \leqq 1.25$, x is a number satisfying $0 \leqq x \leqq 1$, y is a number satisfying $10^{-6} \leqq y \leqq 2\times10^{-1}$, and z is a number satisfying $0<z \leqq 5\times10^{-1}$, as described in Japanese Unexamined Patent Publication No. 57(1982)-23675, a phosphor represented by the formula $M^{III}OX$:xCe wherein $M^{III}$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying $0<x<0.1$, as described in Japanese Unexamined Patent Publication No. 58(1983)-69281, a phosphor represented by the formula $Ba_{1-x}M_{x/2}L_{x/2}FX$:$yEu^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2} \leqq x \leqq 0.5$, and y is a number satisfying $0<y \leqq 0.1$, as described in Japanese Unexamined Patent Publication No. 58(1983)-206678, a phosphor represented by the formula BaFX.xA:$yEu^{2+}$ wherein X is at least one halogen selected from the group consisting of Cl, Br, and I, A is a calcination product of a tetrafluoro boric acid compound, x is a number satisfying $10^{-6} \leqq x \leqq 0.1$, and y is a number satisfying $0<y \leqq 0.1$, as described in Japanese Unexamined Patent Publication No. 59(1984)-27980, a phosphor represented by the formula BaFX.xA:$yEu^{2+}$ wherein X is at least one halogen selected from the group consisting of Cl, Br, and I, A is a calcination product of at least one compound selected from the hexafluoro compound group consisting of salts of hexafluoro silicic acid, hexafluoro titanic acid, and hexafluoro zirconic acid with monovalent or bivalent metals, x is a number satisfying $10^{-6} \leqq x \leqq 0.1$, and y is a number satisfying $0<y \leqq 0.1$, as described in Japanese Unexamined Patent Publication No. 59(1984)-47289, a phosphor represented by the formula BaFX.xNaX':$aEu^{2+}$ wherein each of X and X' is at least one of Cl, Br, and I, x is a number satisfying $0<x \leqq 2$, and a is a number satisfying $0<a \leqq 0.2$, as described in Japanese Unexamined Patent Publication No. 59(1984)-56479, a phosphor represented by the formula $M^{II}FX$.xNaX':$yEu^{2+}$:zA wherein $M^{II}$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x \leqq 2$, y is a number satisfying $0<y \leqq 0.2$, and z is a number satisfying $0<z \leqq 10^{-2}$, as described in Japanese Unexamined Patent Publication No. 59(1984)-56480, a phosphor represented by the formula $M^{II}FX.aM^{I}.bM'^{II}X''_2.cM^{III}X'''_3$.xA:$yEu^{2+}$ wherein $M^{II}$ is at least one alkaline earth metal selected from the group consisting of Ba, Sr, and Ca, $M^{I}$ is at least one alkali metal selected from the group consisting of Li, Na, K, Rb, and Cs, $M'^{II}$ is at least one bivalent metal selected from the group consisting of Be and Mg, $M^{III}$ is at least one trivalent metal selected from the group consisting of Al, Ga, In, and Tl, A is a metal oxide, X is at least one halogen selected from the group consisting of Cl, Br, and I, each of X', X'', and X''' is at least one halogen selected from the group consisting of F, Cl, Br, and I, a is a number satisfying $0 \leqq a \leqq 2$, b is a number satisfying $0 \leqq b \leqq 10^{-2}$, c is a number satisfying $0 \leqq c \leqq 10^{-2}$, and $a+b+c \geqq 10^{-6}$, x is a number satisfying $0<x \leqq 0.5$, and y is a number satisfying $0<y \leqq 0.2$, as described in Japanese Unexamined Patent Publication No. 59(1984)-75200, a stimulable phosphor represented by the formula $M^{II}X_2.aM^{II}X'_2$:$xEu^{2+}$ wherein $M^{II}$ is at least one alkaline earth metal selected from the group consisting of Ba, Sr, and Ca, each of X and X' is at least one halogen selected from the group consisting of Cl, Br, and I, and $X \neq X'$, a is a number satisfying $0.1 \leqq a \leqq 10.0$, and x is a number satisfying $0<x \leqq 0.2$, as described in Japanese Unexamined Patent Publication No. 60(1985)-84381, a stimulable phosphor represented by the formula $M^{II}FX.aM^{I}X'$:$xEu^{2+}$ wherein $M^{II}$ is at least one alkaline earth metal selected from the group consisting of Ba, Sr, and Ca, $M^{I}$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0 \leqq a \leqq 4.0$, and x is a number satisfying $0<x \leqq 0.2$, as described in Japanese Unexamined Patent Publication No. 60(1985)-101173, a stimulable phosphor represented by the formula $M^{I}X$:xBi wherein $M^{I}$ is at least one alkali metal selected from the group consisting of Rb and Cs, X is at least one halogen selected from the group consisting of Cl, Br, and I, and x is a number falling within the range of $0<x \leqq 0.2$, as described in Japanese Unexamined Patent Publication No. 62(1987)-25189, and a cerium activated rare earth element oxyhalide phosphor represented by the formula LnOX:xCe wherein Ln is at least one of La, Y, Gd, and Lu, X is at least one of Cl, Br, and I, x is a number satisfying $0<x \leqq 0.2$, the ratio of X to Ln, expressed in terms of the atomic ratio, falls within the range of $0.500<X/Ln \leqq 0.998$, and a maximum wavelength λ of the stimulation spectrum falls within the range of 550 nm<λ<700 nm, as described in Japanese Unexamined Patent Publication No. 2(1990)-229882.

The stimulable phosphor represented by the formula $M^{II}X_2.aM^{II}X'_2$:$xEu^{2+}$, which is described in Japanese Unexamined Patent Publication No. 60(1985)-84381, may contain the additives described below in the below-mentioned proportions per mol of $M^{II}X_2.aM^{II}X'_2$:

$bM^{I}X''$ wherein $M^{I}$ is at least one alkali metal selected from the group consisting of Rb and Cs, X'' is at least one halogen selected from the group consisting of F, Cl, Br, and I, and b is a number satisfying $0<b \leqq 10.0$, as described in Japanese Unexamined Patent Publication No. 60(1985)-166379, $bKX''.cMgX_2.dM^{III}X'_3$ wherein $M^{III}$ is at least one trivalent metal selected from the group consisting of Sc, Y, La, Gd, and Lu, each of X'', X, and X' is at least one halogen selected from the group consisting of F, Cl, Br, and I, b is a number satisfying $0 \leqq b \leqq 2.0$, c is a number satisfying $0 \leqq c \leqq 2.0$, d is a number satisfying $0 \leqq d \leqq 2.0$, and $2\times10^{-5} \leqq b+c+d$, as described in Japanese Unexamined Patent Publication No. 60(1985)-221483, yB wherein y is a number satisfying $2\times10^{-4} \leqq y \leqq 2\times10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4} \leqq b \leqq 2\times10^{-1}$, as described in Japanese Unexamined Patent Publication No. 60(1985)-228593, bSiO wherein b is a number satisfying $0<b \leqq 3\times10^{-2}$, as described in Japanese Unexamined Patent Publication No. 61(1986)-120883, $bSnX''_2$ wherein X'' is at least one halogen selected from the group consisting of F, Cl, Br, and I, and b is a number satisfying $0<b\leqq 10^{-3}$, as described in Japanese Unexamined Patent Publication No. 61(1986)-120885, $bCsX''.cSnX_2$ wherein each of X" and X is at least one halogen selected from the group consisting of F, Cl, Br, and I, b is a number satisfying $0<b\leqq 10.0$, and c is a number satisfying $10^{-6}\leqq c\leqq 2\times 10^{-2}$, as described in Japanese Unexamined Patent Publication No. 61(1986)-235486, and $bCsX''.yLn^{3+}$ wherein X" is at least one halogen selected from the group consisting of F, Cl, Br, and I, Ln is at least one rare earth element selected from the group consisting of Sc, Y, Ce, Pr, Nd, Sm, Gd, Tb, Dy, Ho, Er, Tm, Yb, and Lu, b is a number satisfying $0<b\leqq 10.0$, and y is a number satisfying $10^{-6}\leqq y\leqq 1.8\times 10^{-1}$, as described in Japanese Unexamined Patent Publication No. 61(1986)-235487.

Of the above-enumerated stimulable phosphors, the bivalent europium activated alkaline earth metal fluorohalide phosphor (e.g., BaFI:Eu), the europium activated alkali metal halide phosphor (e.g., CsBr:Eu), the bivalent europium activated alkaline earth metal halide phosphor containing iodine, the rare earth element-activated rare earth element oxyhalide phosphor containing iodine, and the bismuth activated alkali metal halide phosphor containing iodine exhibit light emission with a high luminance and therefore are preferable. The phosphors described above are capable of taking one the form of an acicular crystal and therefore are apt to have the problems with regard to the water vapor absorption. Accordingly, in cases where the transparent protective film of the radiation image storage panel in accordance with the present invention is employed, the water vapor proof characteristics are capable of being efficiently imparted with respect to the phosphor described above.

The stimulable phosphor layer may be overlaid on the substrate with a known technique, such as the vacuum evaporation technique, the sputtering technique, or the coating technique.

With the vacuum evaporation technique, the substrate is located within a vacuum evaporation apparatus, and the vacuum evaporation apparatus is then evacuated to a degree of vacuum of approximately $10^{-4}$ Pa. Thereafter, at least one kind of stimulable phosphor is heated and evaporated with a resistance heating technique, an electron beam technique, or the like, and a layer of the stimulable phosphor is deposited to a desired thickness on the surface of the substrate. The vacuum evaporation process may be performed in a plurality of stages in order to form the stimulable phosphor layer. Also, in the vacuum evaporation process, a plurality of constituents for a desired stimulable phosphor may be co-evaporated by use of a plurality of resistance heaters or a plurality of electron beams. In this manner, the desired stimulable phosphor may be synthesized on the substrate, and the stimulable phosphor layer may thereby be formed on the substrate. After the vacuum evaporation process has been finished, the formed stimulable phosphor layer may be subjected to heat treatment.

With the sputtering technique, in the same manner as that in the vacuum evaporation technique, the substrate is located within a sputtering apparatus, and the sputtering apparatus is then evacuated to a degree of vacuum of approximately $10^{-4}$ Pa. Thereafter, an inert gas, such as an Ar gas or a Ne gas, acting as the gas for the sputtering is introduced into the sputtering apparatus, and the gas pressure in the sputtering apparatus is set at approximately $10^{-1}$ Pa. Thereafter, sputtering is performed with the stimulable phosphor being set as a target, and the stimulable phosphor is thereby deposited to a desired thickness on the surface of the substrate. As in the cases of the vacuum evaporation process, the sputtering process may be performed in a plurality of stages in order to form the stimulable phosphor layer on the substrate. Also, a plurality of targets constituted of different stimulable phosphors may be utilized and simultaneously or successively subjected to the sputtering in order to form the stimulable phosphor layer. Further, in the sputtering technique, when necessary, a gas, such as an $O_2$ gas, an $H_2$ gas, or a halogen gas, may be introduced into the sputtering apparatus, and a reactive sputtering process may thereby be performed. After the sputtering process has been finished, the formed stimulable phosphor layer may be subjected to heat treatment.

With the coating technique, the stimulable phosphor, a binder, and a solvent are intimately mixed together. In this manner, a coating composition, in which the stimulable phosphor has been dispersed uniformly in the binder solution, is prepared. Thereafter, the coating composition is uniformly applied onto the surface of the substrate. In this manner, a coating film is formed on the surface of the substrate. The operation for applying the coating composition onto the substrate may be performed by utilizing ordinary coating means, such as a doctor blade coater, a roll coater, or a knife coater.

Ordinarily, the layer thickness of the stimulable phosphor layer falls within the range of 20 μm to 1 mm, depending upon the characteristics required of the radiation image storage panel, the kind of the stimulable phosphor, the mixing ratio of the binder to the stimulable phosphor, and the like. The layer thickness of the stimulable phosphor layer should preferably fall within the range of 50 μm to 500 μm.

The substrate may be constituted of a material selected from various kinds of materials known as substrates for conventional radiation image storage panels. In the conventional radiation image storage panels, such that the binding strength between the substrate and the stimulable phosphor layer may be enhanced, or such that the sensitivity of the radiation image storage panel may be enhanced or an image having good image quality (with respect to sharpness and graininess) may be obtained with the radiation image storage panel, a high-molecular weight substance, such as gelatin, is applied onto the surface of the substrate, on which surface the stimulable phosphor layer is to be overlaid, in order to form an adhesive properties imparting layer, or a light reflecting layer constituted of a light reflecting substance, such as titanium dioxide, a light absorbing layer constituted of a light absorbing substance, such as carbon black, or the like, is formed on the surface of the substrate, on which surface the stimulable phosphor layer is to be overlaid. In the radiation image storage panel in accordance with the present invention, various such layers may be formed on the substrate. The layer constitution may be selected arbitrarily in accordance with the characteristics which the radiation image storage panel should have, and the like.

Also, as described in Japanese Unexamined Patent Publication No. 59(1984)-200200, such that an image having a high sharpness may be obtained, fine concavities and convexities may be formed on the surface of the substrate, on which surface the stimulable phosphor layer is to be overlaid. (In cases where the adhesive properties imparting layer, the light reflecting layer, the light absorbing layer, or the like, is formed on the surface of the substrate, on which surface the stimulable phosphor layer is to be overlaid, fine concavities and convexities may be formed on the surface of the layer formed on the substrate.)

The first radiation image storage panel in accordance with the present invention will further be illustrated by the following non-limitative examples.

EXAMPLE 1

Formation of Transparent Protective Film

As a base material film, an organic primer layer was coated to a thickness of 1.5 μm on a surface of a 12 μm-thick PET film. A silicon oxide layer having a thickness of 50 nm was then formed on the organic primer layer with a film forming process, in which a plasma enhanced CVD technique using an organic silicon compound (hexamethyl disiloxane) was performed while oxygen was being supplied. In this manner, a water vapor proof film was formed. Also, a water vapor proof film was formed in the same manner. Thereafter, the thus formed two water vapor proof films were laminated together via a 2.5 μm-thick polyester resin layer by use of a dry lamination technique, such that the two water vapor proof films took an identical orientation (i.e., such that the surface of the silicon oxide layer constitutes one surface side of the combination of the two water vapor proof films). In this manner, a 530 mm-square, 27 μm-thick transparent protective film was obtained. The water vapor transmission rate of the thus obtained transparent protective film was equal to 0.1 $g/m^2$.

Adhesion of Transparent Protective Film and Glass Sealing Frame

A soda-lime glass sealing frame (size: 450 mm-square, thickness: 0.5 mm, width: 6 mm, internal corner roundness: 2 mm-diameter) and the silicon oxide layer surface of the transparent protective film having been obtained in the manner described above were adhered to each other by use of a two-pack curable epoxy resin (XB5047, XB5067, supplied by Bantico K.K., water vapor transmission coefficient of each of XB5047 and XB5067: 0.5 $g\cdot mm/(m^2\cdot d)$). At this time, the sealing frame and the transparent protective film were superposed one upon the other such that the center point of the sealing frame and the center point of the transparent protective film coincided with each other, and the region of the surface of the transparent protective film, which region came into contact with the frame surface of the sealing frame, was adhered to the frame surface of the sealing frame. Also, at this time, the two-pack curable epoxy resin was subjected to the curing at a temperature of 40° C. for one day, and the combination of the transparent protective film and the glass sealing frame adhered to each other was thus obtained. The water vapor transmission coefficient of the epoxy resin was measured in the manner described below. Specifically, the resin was molded uniformly to a piece having a thickness of approximately 1 mm and a predetermined are a, the molded resin piece was cured sufficiently, and a measurement sample was thus prepared. The thickness of the thus prepared measurement sample was then measured accurately to three significant figures by use of slide calipers. Thereafter, the water vapor transmission rate of the measurement sample was measured in accordance with JIS Z0208 (cup method), and the water vapor transmission coefficient was calculated from multiplication by the measurement sample thickness (in units of mm).

Formation of Stimulable Phosphor Layer

As a substrate, a soda-lime glass plate having a 450 mm-square size and a thickness of 8 mm was prepared. The soda-lime glass plate had a 5 mm-diameter pressure reducing hole, which was located at a corner region such that the distances between the center point of the pressure reducing hole and two adjacent sides of the soda-lime glass plate were equal to 11 mm. Also, a region of one surface of the soda-lime glass plate, which region was other than a marginal are a (marginal are a width: 8 mm), was provided with an Al evaporated reflecting layer. Masks were then located at the region extending over 8 mm from the periphery on the side of the reflecting layer and at the pressure reducing hole. The soda-lime glass plate was then located within a vacuum evaporation machine such that the surface of the reflecting layer free from the masks might be subjected to vacuum evaporation processing. Thereafter, an $EuBr_2$ tablet and a CsBr tablet were located at a predetermined position within the vacuum evaporation machine, and the vacuum evaporation machine was evacuated to a vacuum of 1.0 Pa. The substrate was then heated with a heater to a temperature of 100° C. Thereafter, the $EuBr_2$ tablet and the CsBr tablet accommodated within a platinum boat were heated. In this manner, a stimulable phosphor (CsBr:Eu) was deposited on the region of the one surface of the substrate, which region was other than the masked regions, to a thickness of 500 μm. In a dry atmosphere, the region in the vacuum evaporation machine was returned to the atmospheric pressure, and the substrate was taken out from the vacuum evaporation machine. It was confirmed that acicular stimulable phosphor crystals having a thickness of approximately 8 μm were densely deposited in an upright orientation on the substrate with a slight spacing from one another.

Sealing of Stimulable Phosphor Layer

The soda-lime glass substrate having been prepared in the manner described above, on which the Al-evaporated reflecting layer had been overlaid, and on which the CsBr:Eu stimulable phosphor had been formed with the vacuum evaporation technique, except for the region for adhesion (extending over 8 mm from the periphery) and the pressure reducing hole, and the transparent protective film, to which the sealing frame had been adhered, were adhered to each other under pressure by use of an adhesive agent (SU2153-9, supplied by Sunkolec Co., Ltd., water vapor transmission coefficient: 20 $g\cdot mm/(m^2\cdot d)$, as measured with the same procedure as that described above). The adhesive agent was then subjected to a curing process at normal temperatures (25° C.) for 12 hours. Further, EDPM rubber was embedded into the pressure reducing hole and adhered to the pressure reducing hole by use of an adhesive agent (SU2153-9), and the pressure reducing hole was thus closed. In this manner, a structure, in which the stimulable phosphor evaporated layer was closed by the substrate, the sealing frame, and the transparent protective film, was formed. Thereafter, the EDPM rubber having been embedded in the pressure reducing hole of the closed structure was pierced with an injection needle, and gas was discharged from the closed structure by use of a vacuum pump. The region within the closed structure was thus set in a reduced pressure state. Thereafter, a glass plug, onto which an adhesive agent (SU2153-9) had been applied, was adhered to the EDPM rubber of the pressure reducing hole. Thereafter, the peripheral region (length: 4 cm) of the transparent protective film was folded back to the back surface of the substrate and adhered to the back surface of the substrate by used of an ultraviolet-curing resin (XNR5516, supplied by Nagase Chemtex K.K.). In this manner, a radiation image storage panel was obtained.

EXAMPLE 2

A radiation image storage panel was prepared in the same manner as that in Example 1, except that the soda-lime glass sealing frame and the surface of the silicon oxide layer of the transparent protective film were adhered to each other by use of a two-pack curable urethane resin (SU2153-9, supplied by Sunyulec Co., Ltd.).

EXAMPLE 3

A radiation image storage panel was prepared in the same manner as that in Example 2, except that a stimulable phosphor layer was formed in the manner described below. Specifically, 2,000 ml of an aqueous BaI solution (3.5N) and 100 ml of an aqueous $EuBr_3$ solution (0.2N) were introduced into a reaction vessel, and the resulting reaction mother liquid was kept at a temperature of 82° C. with stirring. Thereafter, 200 ml of an ammonium fluoride solution (8N) was introduced into the reaction mother liquid by use of a pump, and precipitates were thus formed. After maturing was performed for two hours, the precipitates were collected by filtration, washed with methanol, and dried. In this manner, a BaFI crystal was obtained. After the thus obtained BaFI crystal was uniformly mixed with ultrafine alumina particles, the resulting mixture was filled in a quartz board and fired with a tube furnace under a hydrogen gas atmosphere at a temperature of 825° C. for 1.5 hours. In this manner, europium activated BFI stimulable phosphor particles were obtained. Thereafter, the europium activated BFI stimulable phosphor particles were classified, and the europium activated BFI stimulable phosphor particles having a mean particle diameter of 3 μm were obtained.

Thereafter, 300 g of the europium activated BFI stimulable phosphor particles having been obtained in the manner described above, 11 g of a polyurethane resin, and ¼ g of a bisphenol type epoxy resin were added to a methyl ethyl ketone-toluene mixed solvent, and the resulting mixture was subjected to a dispersing process with a propeller mixer. In this manner, a coating composition for the formation of a stimulable phosphor layer, which coating composition had a viscosity of 25 ps to 30 ps, was prepared. The coating composition for the formation of a stimulable phosphor layer was then applied onto a PET film, which was provided with a priming layer, with a doctor blade coating technique. The thus formed coating layer was dried at a temperature of 100° C. for 15 minutes, and a stimulable phosphor layer having a thickness of 250 μm was formed.

COMPARATIVE EXAMPLE 1

A radiation image storage panel was prepared in the same manner as that in Example 1, except that the soda-lime glass sealing frame and the base material film side of the transparent protective film were adhered to each other by use of the two-pack curable epoxy resin.

COMPARATIVE EXAMPLE 2

A radiation image storage panel was prepared in the same manner as that in Example 1, except that a transparent protective film was obtained by laminating the silicon oxide layer of one of the transparent protective films, which had been prepared in the same manner as that in Example 1, and the silicon oxide layer of the other transparent protective film together via a 2.5 μm-thick transparent polyurethane resin layer by use of a dry lamination technique, and the base material film side of the transparent protective film and the soda-lime glass sealing frame were adhered to each other by use of the two-pack curable epoxy resin.

Evaluation Methods

The radiation image storage panels having been formed in Examples 1, 2, and 3 and Comparative Examples 1 and 2 described above were evaluated with respect to a thickness, image sharpness, a light emission lowering rate, which acted as an index for durability, and a peeling resistance of the transparent protective film. The results shown in Table 1 below were obtained. The image sharpness and the light emission lowering rate were measured in the manner described below.

Image Sharpness

X-rays having been produced at a tube voltage of 80 kVp were irradiated to the radiation image storage panel. Thereafter, the radiation image storage panel was scanned with stimulating rays having a wavelength of 650 nm, and the stimulable phosphor layer of the radiation image storage panel was thus stimulated with the stimulating rays to emit light. The emitted light was detected and converted into an electric signal. An image was then reproduced from the electric signal by use of an image reproducing apparatus, and the reproduced image was displayed on a displaying apparatus. The thus obtained image was analyzed with a computer, and a modulation transfer function (MTF) (frequency: 2 cycles/mm) of the image was obtained. A high MTF value represents high image sharpness.

Light Emission Lowering Rate

X-rays were irradiated to the radiation image storage panel, and energy from the X-rays was thus stored on the radiation image storage panel. Thereafter, linear stimulating rays were irradiated to the radiation image storage panel from the side of the transparent protective layer, and light emitted by the radiation image storage panel was detected with a line sensor. The intensity of the emitted light having thus been detected was taken as an initial value. Also, the radiation image storage panel was subjected to thermal processing, in which the radiation image storage panel was left to stand within a constant temperature vessel at a temperature of 55° C. and relative humidity of 95% for 30 days, and thereafter the measurement of the intensity of the emitted light (i.e., the value after thermal processing) was performed. The light emission lowering rate was calculated with the formula shown below.

$$\text{Light emission lowering rate (\%)}=\{(\text{initial value}-\text{value after thermal processing})/\text{initial value}\}\times 100$$

The results shown in Table 1 below were obtained.

TABLE 1

| | Thickness (μm) | Image sharpness (%) | Light emission lowering rate (%) | Peeling resistance |
|---|---|---|---|---|
| Ex. 1 | 27 | 41 | 3 | High |
| Ex. 2 | 27 | 41 | 4 | High |
| Ex. 3 | 27 | 40 | 2 | High |
| Comp. Ex. 1 | 27 | 41 | 6 | Easily peeled |
| Comp. Ex. 2 | 41 | 38 | 2 | Easily peeled |

With the first radiation image storage panel in accordance with the present invention, the transparent protective film comprises at least one layer of the water vapor proof film, which comprises the base material film and the transparent inorganic layer overlaid on the base material film, and the transparent protective film is located such that the transparent inorganic layer of the water vapor proof film stands facing the stimulable phosphor layer. Therefore, as clear from Table 1, the anti-scratching characteristics of the first radiation image storage panel in accordance with the present invention are capable of being enhanced. Also, with the first radiation image storage panel in accordance with the present invention, wherein the stimulable phosphor layer is sealed by use of the adhesive agent, the radiation image storage panel is capable of having good water vapor proof characteristics and good durability. Further, with the first radiation image storage panel in accordance with the present invention, the protective film is capable of being kept thin. Therefore, the first radiation image storage panel in accordance with the present invention is capable of having a high sensitivity and yielding an image having good image quality.

With the radiation image storage panel of Comparative Example 1, wherein the water vapor proof film side of the water vapor proof film stands facing the stimulable phosphor layer, the durability is low, and the protective film is easily peeled off. Also, with the radiation image storage panel of Comparative Example 2, wherein the transparent inorganic layer of one of the water vapor proof films and the transparent inorganic layer of the other water vapor proof film stand facing each other, optical interference occurs within the protective film, an artifact occurs in an obtained image, and the protective film is easily peeled off.

Embodiments of the second radiation image storage panel in accordance with the present invention will be described hereinbelow.

Figure 4:
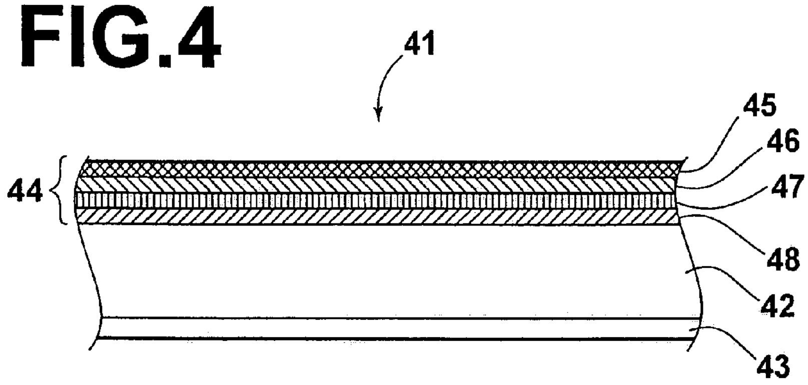
FIG. 4 is a schematic sectional view showing a fourth embodiment of the radiation image storage panel in accordance with the present invention.

FIG. 4 is a schematic sectional view showing a fourth embodiment of the radiation image storage panel in accordance with the present invention. As illustrated in FIG. 4, a radiation image storage panel 41 comprises a substrate 43. The radiation image storage panel 41 also comprises a stimulable phosphor layer 42 and a protective layer 44, which are overlaid on the substrate 43. The protective layer 44 comprises a base material layer 45 and a fundamental inorganic layer 46 overlaid on the base material layer 45. The protective layer 44 also comprises a first high-order inorganic layer 47 and a second high-order inorganic layer 48, which are overlaid on the fundamental inorganic layer 46. The second high-order inorganic layer 48 of the protective layer 44 and the stimulable phosphor layer 42 are adhered to each other with an adhesive agent, or the like, or are laminated together by use of a reduced pressure lamination technique. In this manner, the radiation image storage panel 41 is formed. In FIG. 4, two high-order inorganic layers 47 and 48 are formed. Alternatively, only one high-order inorganic layer may be formed. As another alternative, three or more high-order inorganic layers may be formed. However, from the view point of the production cost, the number of the high-order inorganic layers should preferably be at most ten.

In the embodiment of FIG. 4, the protective layer 44 is prepared previously by directly overlaying the fundamental inorganic layer 46, the first high-order inorganic layer 47, and the second high-order inorganic layer 48 on the base material layer 45 and is adhered to the stimulable phosphor layer 42 with an adhesive agent, or the like, or is laminated with the stimulable phosphor layer 42 by use of the reduced pressure lamination technique. Alternatively, instead of the base material layer 45 being utilized, the fundamental inorganic layer 46, the first high-order inorganic layer 47, and the second high-order inorganic layer 48 may be overlaid directly on the stimulable phosphor layer 42.

The layer thickness of either one of the first high-order inorganic layer 47 and the second high-order inorganic layer 48, or both the layer thickness of the first high-order inorganic layer 47 and the layer thickness of the second high-order inorganic layer 48, should preferably be larger than the layer thickness of the fundamental inorganic layer 46. In such cases, the first high-order inorganic layer 47 and/or the second high-order inorganic layer 48, which has the layer thickness larger than the layer thickness of the fundamental inorganic layer 46, should preferably have a layer thickness falling within the range of 20 nm to 1,000 nm, and should more preferably have a layer thickness falling within the range of 30 nm to 500 nm. Variations of the layer thickness of each inorganic layer should preferably be as small as possible. Also, the set of the fundamental inorganic layer 46 and the first high-order inorganic layer 47, which are adjacent to each other, or the set of the first high-order inorganic layer 47 and the second high-order inorganic layer 48, which are adjacent to each other, should preferably be have different crystal structures.

Figure 5:
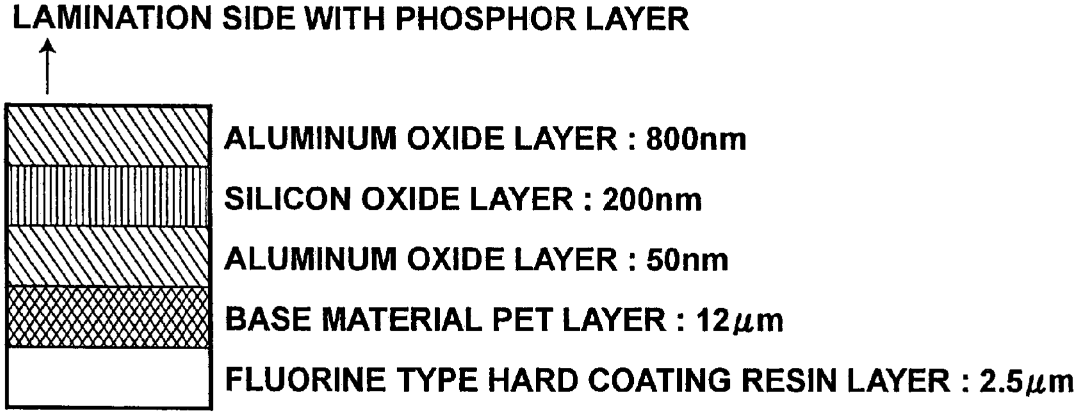
FIG. 5 is a schematic sectional view showing an example of a protective layer of the radiation image storage panel shown in FIG. 4.

FIG. 5, FIG. 6, FIG. 7, and FIG. 8 are schematic sectional views showing various examples of protective layers. Numerical values shown in FIG. 5, FIG. 6, FIG. 7, and FIG. 8 represent the layer thicknesses. In FIG. 5, FIG. 6, FIG. 7, and FIG. 8, different layer compositions are taken as examples of different crystal structures. The protective layer illustrated in FIG. 5 comprises a base material PET layer. The protective layer illustrated in FIG. 5 also comprises an aluminum oxide layer (acting as the fundamental inorganic layer), a silicon oxide layer (acting as the first high-order inorganic layer), and an aluminum oxide layer (acting as the second high-order inorganic layer), which are overlaid directly on the base material PET layer. Further, a fluorine type hard coating layer for enhancing the anti-scratching characteristics is formed under the base material PET layer (i.e., on the side constituting the top surface of the radiation image storage panel). Both the layer thickness of the silicon oxide layer acting as the first high-order inorganic layer and the layer thickness of the aluminum oxide layer acting as the second high-order inorganic layer are larger than the layer thickness of the aluminum oxide layer acting as the fundamental inorganic layer. In the example shown in FIG. 5, the hard coating layer is formed. Alternatively, in lieu of the hard coating layer, a stain proof layer for enhancing the stain proof characteristics may be formed. Also, the surface of the protective layer may be subjected to AR coating. In cases where the constitution shown in FIG. 5 is taken as an example, the surface of the base material layer and/or the surface of the aluminum oxide layer acting as the second high-order inorganic layer may be subjected to the AR coating for suppressing unnecessary light reflection. In the example of the protective layer shown in FIG. 5, lamination under reduced pressure is performed such that the stimulable phosphor layer and the surface of the aluminum oxide layer acting as the second high-order inorganic layer stand facing each other.

Figure 6:
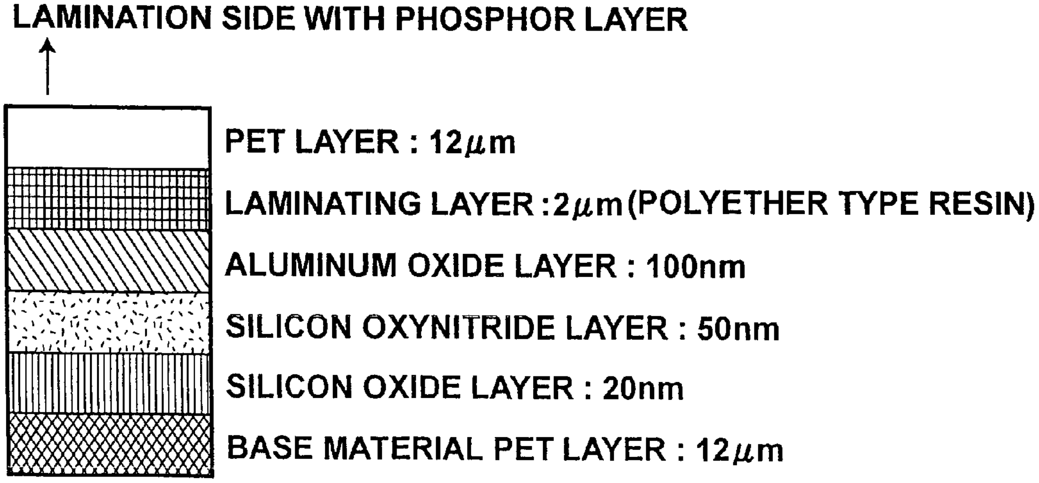
FIG. 6 is a schematic sectional view showing a different example of a protective layer of the radiation image storage panel shown in FIG. 4.

The protective layer illustrated in FIG. 6 comprises a base material PET layer. The protective layer illustrated in FIG. 6 also comprises a silicon oxide layer (acting as the fundamental inorganic layer), a silicon oxynitride layer (acting as the first high-order inorganic layer), and an aluminum oxide layer (acting as the second high-order inorganic layer), which are overlaid directly on the base material PET layer. As in the example of the protective layer illustrated in FIG. 6, the fundamental inorganic layer and the high-order inorganic layers may be constituted of the inorganic layers having different compositions. Also, as illustrated in FIG. 6, the aluminum oxide layer acting as the highest-order inorganic layer may be laminated with the stimulable phosphor layer via a laminating layer and a PET layer.

Figure 7:
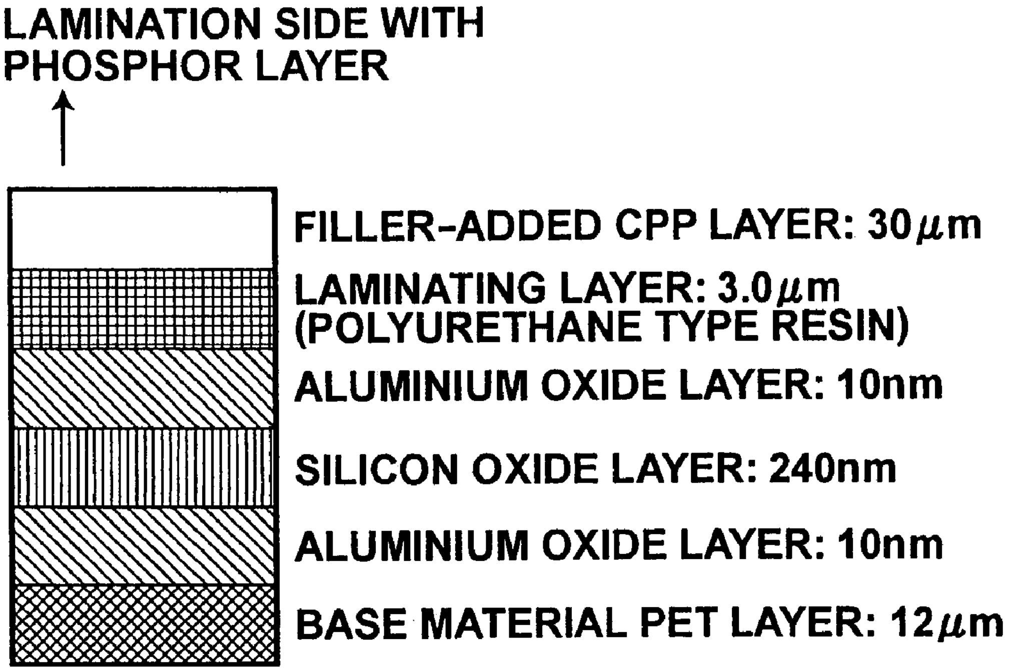
FIG. 7 is a schematic sectional view showing a further different example of a protective layer of the radiation image storage panel shown in FIG. 4.

The protective layer illustrated in FIG. 7 comprises a base material PET layer. The protective layer illustrated in FIG. 7 also comprises an aluminum oxide layer (acting as the fundamental inorganic layer), a silicon oxide layer (acting as the first high-order inorganic layer), and an aluminum oxide layer (acting as the second high-order inorganic layer), which are overlaid directly on the base material PET layer. The layer thickness of the silicon oxide layer acting as the first high-order inorganic layer is larger than the layer thickness of the aluminum oxide layer acting as the fundamental inorganic layer. As in the example of the protective layer shown in FIG. 7, the layer thickness of at least one layer among the plurality of the high-order inorganic layers may be larger than the layer thickness of the fundamental inorganic layer. Also, as illustrated in FIG. 7, a casting polypropylene (CPP) layer, which has been added with a filler additive for imparting an appropriate level of haze to the protective layer, may be formed on the aluminum oxide layer acting as the second high-order inorganic layer. In such cases, the haze value of the protective layer should preferably be adjusted to a value falling within the range of 3% to 70%.

Figure 8:
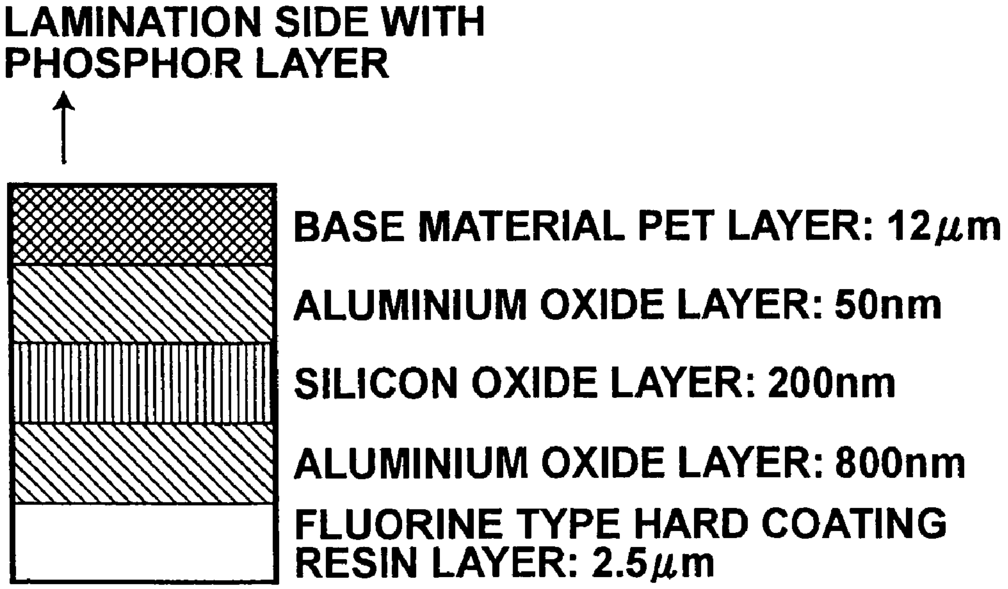
FIG. 8 is a schematic sectional view showing a still further different example of a protective layer of the radiation image storage panel shown in FIG. 4.

In each of the protective layers illustrated in FIG. 5, FIG. 6, and FIG. 7, the side of the second high-order inorganic layer is laminated with the stimulable phosphor layer. Alternatively, as illustrated in FIG. 8, the side of the base material layer may be laminated with the stimulable phosphor layer.

Figure 9:
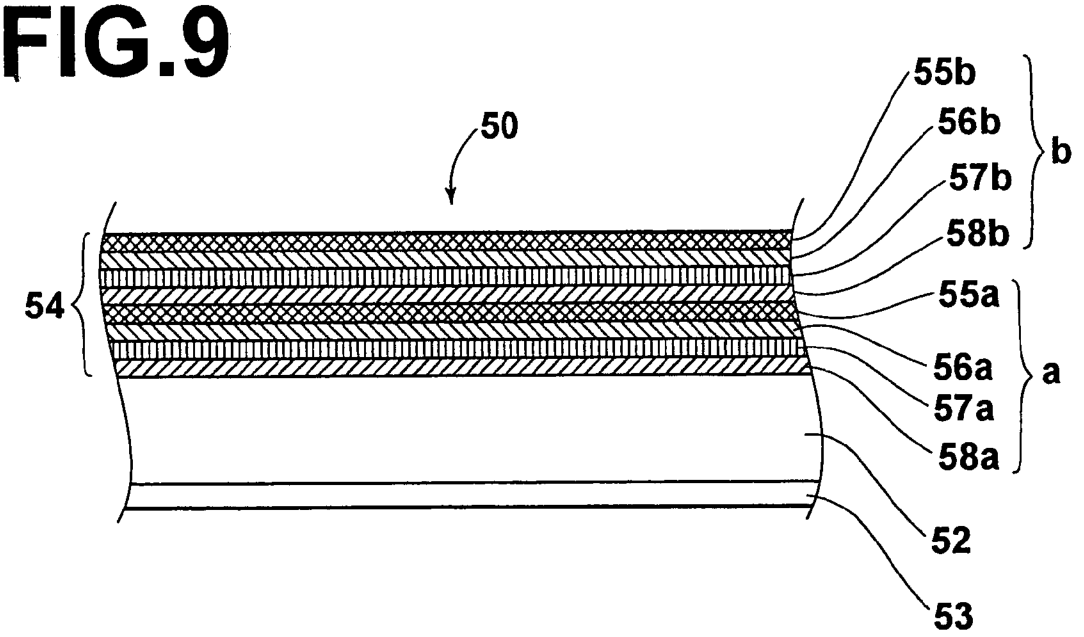
FIG. 9 is a schematic sectional view showing a fifth embodiment of the radiation image storage panel in accordance with the present invention.
Figure 10:
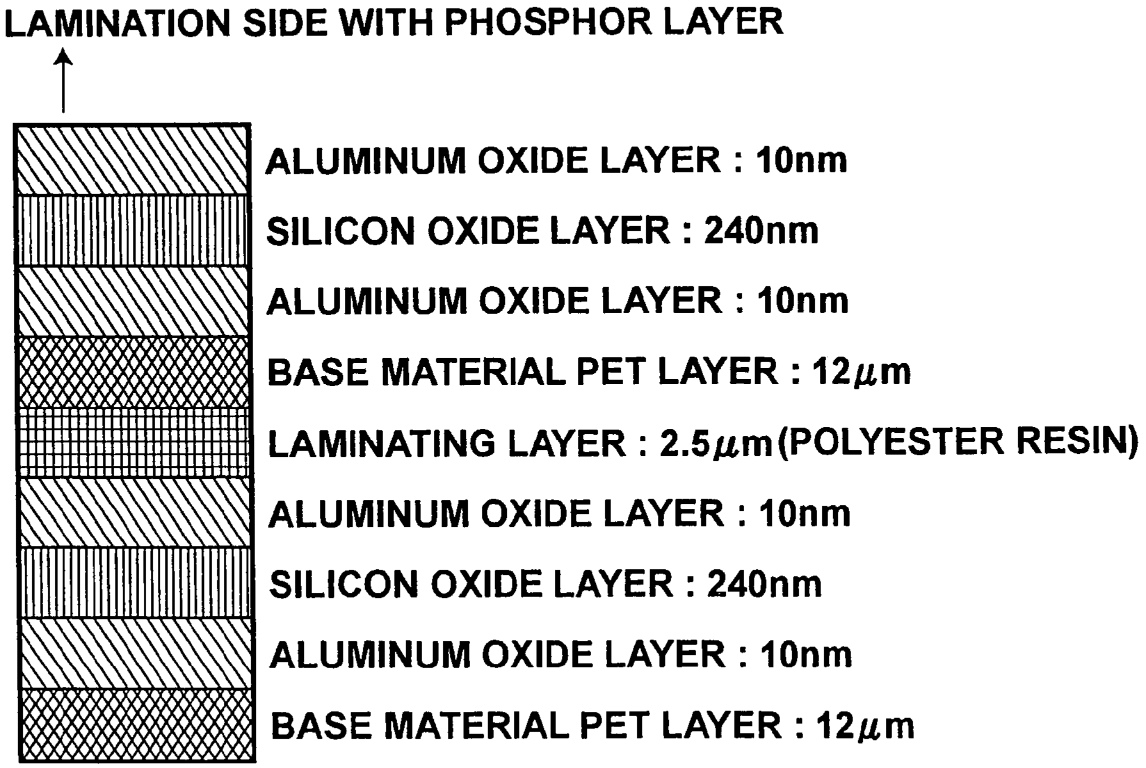
FIG. 10 is a schematic sectional view showing an example of a protective layer of the radiation image storage panel shown in FIG. 9.

FIG. 9 is a schematic sectional view showing a fifth embodiment of the radiation image storage panel in accordance with the present invention. As illustrated in FIG. 9, a radiation image storage panel 50 comprises a substrate 53. The radiation image storage panel 50 also comprises a stimulable phosphor layer 52 and a protective layer 54, which are overlaid on the substrate 53. The protective layer 54 comprises a laminated material "a" and a laminated material "b." The laminated material "a" comprises a base material layer 55*a*. The laminated material "a" also comprises a fundamental inorganic layer 56*a*, a first high-order inorganic layer 57*a*, and a second high-order inorganic layer 58*a*, which are overlaid directly on the base material layer 55*a*. The laminated material "b" comprises abase material layer 55*b*. The laminated material "b" also comprises a fundamental inorganic layer 56*b*, a first high-order inorganic layer 57*b*, and a second high-order inorganic layer 58*b*, which are overlaid directly on the base material layer 55*b*. The stimulable phosphor layer 52 and the second high-order inorganic layer 58*a* of the laminated material "a" are adhered to each other with an adhesive agent, or the like, or are laminated together by use of a reduced pressure lamination technique. Also, the base material layer 55*a* of the laminated material "a" and the second high-order inorganic layer 58*b* of the laminated material "b" are adhered to each other with an adhesive agent, or the like, or are laminated together by use of a reduced pressure lamination technique. In the embodiment of FIG. 9, the laminated material "a" and the laminated material "b" are superposed one upon the other such that the order of the overlaying of the layers constituting the laminated material "a" and the order of the overlaying of the layers constituting the laminated material "b" are identical with each other. Alternatively, the laminated material "a" and the laminated material "b" may be superposed one upon the other such that the order of the overlaying of the layers constituting the laminated material "a" and the order of the overlaying of the layers constituting the laminated material "b" are reverse to each other. Specifically, the laminated material "a" and the laminated material "b" may be superposed one upon the other such that the base material layer 55*a* of the laminated material "a" and the base material layer 55*b* of the laminated material "b" stand facing each other, and such that the second high-order inorganic layer 58*b* of the laminated material "b" constitutes the top surface of the radiation image storage panel 50. Further, in the embodiment of FIG. 9, the laminated material "a" and the laminated material "b" have the identical layer constitution. Alternatively, the laminated material "a" and the laminated material "b" may have different layer constitutions.

Figure 11:
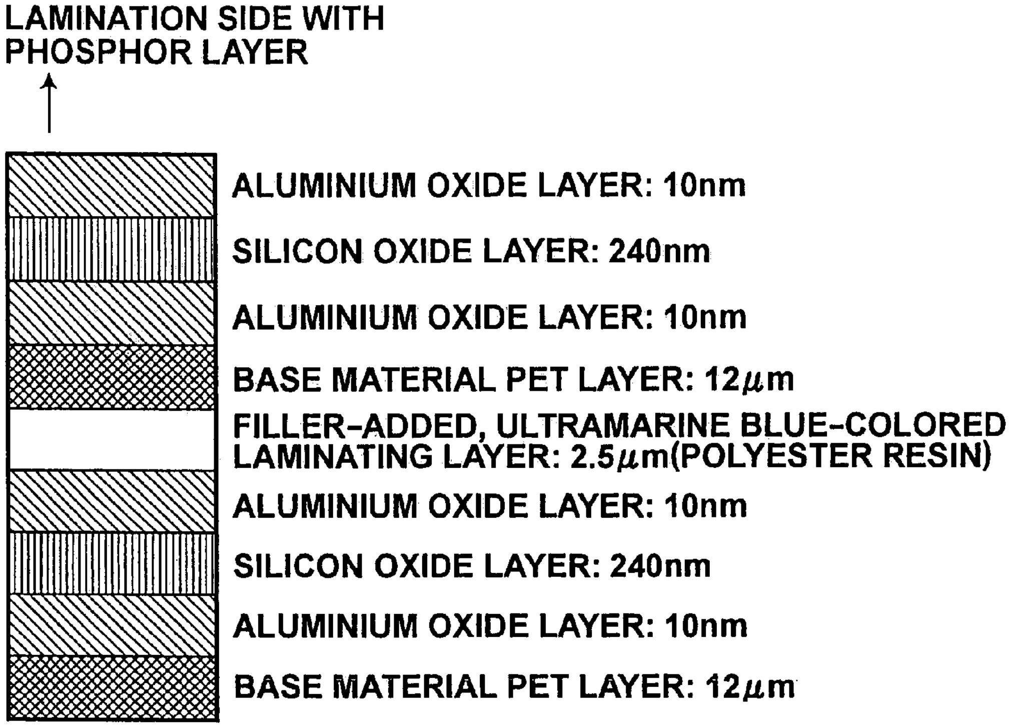
FIG. 11 is a schematic sectional view showing a different example of a protective layer of the radiation image storage panel shown in FIG. 9.

FIG. 10, FIG. 11, FIG. 12, and FIG. 13 are schematic sectional views showing various examples of protective layers, each of which may be employed as the protective layer of the radiation image storage panel shown in FIG. 9. The protective layer illustrated in FIG. 10 comprises two laminated materials, which are adhered to each other via a laminating layer. Each of the two laminated materials comprises a base material PET layer. Each of the two laminated materials also comprises an aluminum oxide layer (acting as the fundamental inorganic layer), a silicon oxide layer (acting as the first high-order inorganic layer), and an aluminum oxide layer (acting as the second high-order inorganic layer), which are overlaid directly on the base material PET layer. In each of the two laminated materials constituting the protective layer illustrated in FIG. 10, the layer thickness of the silicon oxide layer acting as the first high-order inorganic layer is larger than the layer thickness of the aluminum oxide layer acting as the fundamental inorganic layer. Alternatively, only in one of the two laminated materials, the layer thickness of the silicon oxide layer acting as the first high-order inorganic layer is larger than the layer thickness of the aluminum oxide layer acting as the fundamental inorganic layer. Also, as illustrated in FIG. 11, the laminating layer of the protective layer illustrated in FIG. 10 may be added with a filler and a coloring agent, which has little effect upon the wavelengths of the light emitted by the stimulable phosphor layer.

Figure 12:
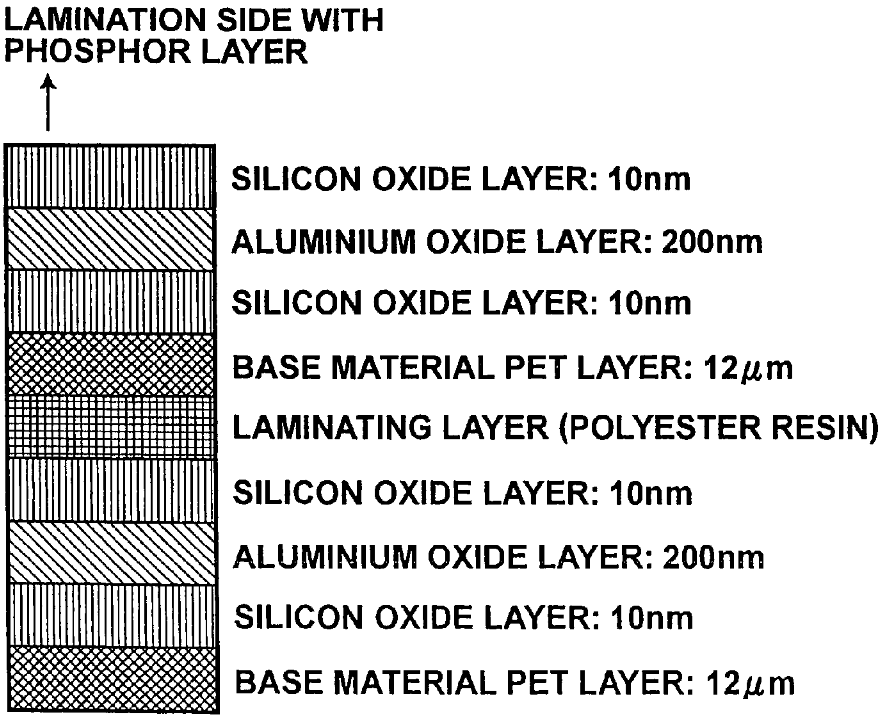
FIG. 12 is a schematic sectional view showing a further different example of a protective layer of the radiation image storage panel shown in FIG. 9.

Further, as illustrated in FIG. 12, the layer overlaying order of base material layer—aluminum oxide layer—silicon oxide layer—aluminum oxide layer described above may be altered to a layer overlaying order of base material layer—silicon oxide layer—aluminum oxide layer—silicon oxide layer.

Figure 13:
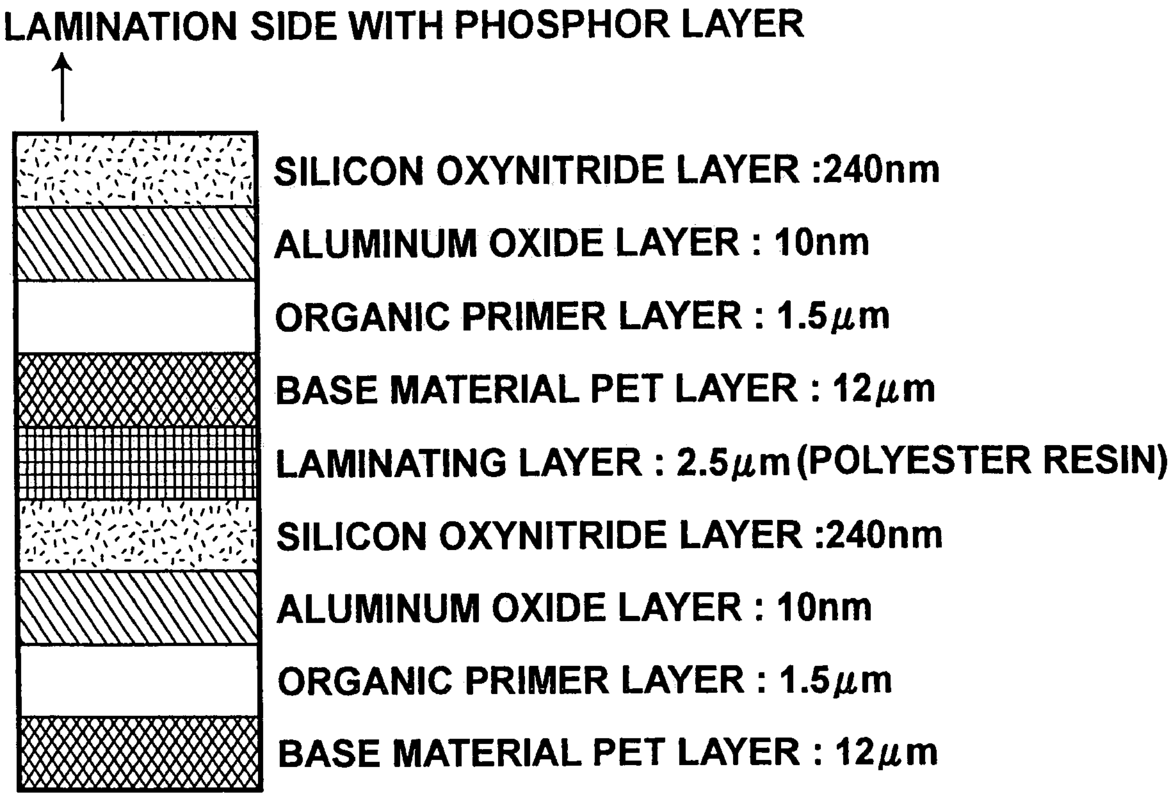
FIG. 13 is a schematic sectional view showing a still further different example of a protective layer of the radiation image storage panel shown in FIG. 9.

The protective layer illustrated in FIG. 13 comprises two laminated materials, which are adhered to each other via a laminating layer. Each of the two laminated materials comprises a base material PET layer and an organic primer layer, which is overlaid on the base material PET layer. Each of the two laminated materials also comprises an aluminum oxide layer (acting as the fundamental inorganic layer) and a silicon oxynitride layer (acting as the first high-order inorganic layer), which are overlaid directly on the organic primer layer. As in the example of the protective layer shown in FIG. 13, the organic primer layer may be located between the base material layer and the fundamental inorganic layer. The organic primer layer is overlaid as a layer only with a coating technique or a vacuum evaporation technique performed on the base material layer. In this point, the organic primer layer varies from the laminating layer described above. In cases where the organic primer layer is formed, the water vapor proof characteristics are capable of being enhanced even further. In the example of the protective layer shown in FIG. 13, the organic primer layer is located between the base material layer and the fundamental inorganic layer. Alternatively, the organic primer layer may be located atone of the other positions. The organic primer layer may also be formed in the cases of the protective layers illustrated in FIG. 5, FIG. 6, FIG. 7, FIG. 8, and FIG. 9.

The layers constituting the radiation image storage panel will hereinbelow be described in more detail.

Each of the fundamental inorganic layer and the high-order inorganic layer should preferably contain a metal oxide, a metal nitride, a metal oxynitride, or the like. More specifically, the inorganic layer should preferably be a transparent evaporated layer formed with a vacuum evaporation technique utilizing an inorganic material, which exhibits no light absorption with respect to light having wavelengths falling within the range of 300 nm to 1,000 nm and has gas barrier characteristics. Examples of the inorganic materials, which exhibit no light absorption with respect to the light having wavelengths falling within the range of 300 nm to 1,000 nm, include silicon oxide, silicon nitride, aluminum oxide, aluminum nitride, zirconium oxide, tin oxide, silicon oxynitride, and aluminum oxynitride. Aluminum oxide and silicon oxide may be subjected alone to the vacuum evaporation technique. However, in cases where aluminum oxide and silicon oxide are subjected together to the vacuum evaporation technique, the gas barrier characteristics are capable of being enhanced. Therefore, in cases where aluminum oxide and silicon oxide are utilized for the formation of the inorganic layer, aluminum oxide and silicon oxide should preferably be subjected together to the vacuum evaporation technique. Among the above-enumerated inorganic materials, aluminum oxide, silicon oxide, and silicon oxynitride have a high light transmittance and good gas barrier characteristics. Specifically, with aluminum oxide, silicon oxide, or silicon oxynitride, a dense film free from cracks and micro-pores is capable of being formed. Therefore, aluminum oxide, silicon oxide, and silicon oxynitride are more preferable as the inorganic materials.

The high-order inorganic layer is overlaid directly upon an inorganic layer, which is located under the high-order inorganic layer. The fundamental inorganic layer need not necessarily be overlaid directly on the base material layer, or the like. However, the fundamental inorganic layer should preferably be overlaid directly on the base material layer, or the like. The inorganic layer is formed with the dry process technique, such as the sputtering technique, the PVD technique, or the CVD technique, or the wet process technique, such as the sol-gel technique, as described above and is overlaid directly on an inorganic layer, which is located under the inorganic layer. With any of the above-enumerated techniques, the transparency and the barrier characteristics of the obtained inorganic layer do not vary largely. Therefore, one of the above-enumerated techniques may be selected appropriately. However, from the view point of easiness and simplicity of layer formation, the CVD technique is preferable as the vacuum deposition technique. Particularly, the plasma enhanced CVD technique (i.e., the PE-CVD technique), the ECR-PE-CVD technique, and the like, are preferable.

The base material layer may be constituted of a material, such as a PET, a polycycloolefin, a polyethylene naphthalate (PEN), a polyvinyl alcohol (PVA), a nano-alloy polymer of a PET and a polyether imide (PEI), or a transparent aramid. In particular, the base material layer should preferably have a glass transition temperature (Tg) of at least 85° C., and should more preferably have a glass transition temperature (Tg) of at least 100° C. The base material layer should preferably be constituted of a material, such as a polycycloolefin, a polyethylene naphthalate (PEN), a polyvinyl alcohol (PVA), a nano-alloy polymer of a PET and a polyether imide (PEI), or a transparent aramid, which has a glass transition temperature of at least 85° C. The base material layer should more preferably be constituted of a material, such as a polycycloolefin, a polyethylene naphthalate (PEN), a nano-alloy polymer of a PET and a polyether imide (PEI), or a transparent aramid, which has a glass transition temperature of at least 100° C.

The PET, the materials capable of being employed appropriately as the material for the base material layer, and the glass transition temperatures of these materials are listed in Table 2 below.

TABLE 2

| Material name | Tg (° C.) |
|---|---|
| PET | 70~80 |
| Polycycloolefin | 100~163 |
| PEN | 121 |
| PVA | 85 |
| PET/PEI (nano-alloy polymer) | 115 |
| Transparent aramid | 230 |

In cases where the protective layer comprises two base material layers, on each of which the fundamental inorganic layer is overlaid directly, as in the embodiment of FIG. 9, at least either one of the two base material layers should preferably have a glass transition temperature of at least 85° C., and should more preferably have a glass transition temperature of at least 100° C. Both the two base material layers should particularly preferably have a glass transition temperature of at least 85° C., and should most preferably have a glass transition temperature of at least 100° C.

The organic primer layer may be constituted of a transparent high-molecular weight material. Examples of the transparent high-molecular weight materials include cellulose derivatives, such as cellulose acetate and nitrocellulose; and synthetic high-molecular weight materials, such as a polymethyl methacrylate, a polyvinyl butyral, a polyvinyl formal, a polycarbonate, a polyvinyl acetate, a vinyl chloride-vinyl acetate copolymer, a fluorine type of resin, a polyethylene, a polypropylene, a polyester, an acrylic resin, a poly-para-xylene, a PET, hydrochlorinated rubber, and a vinylidene chloride copolymer. The above-enumerated synthetic high-molecular weight materials for the formation of the organic primer layer may be utilized in the form of the polymers. Alternatively, monomers for forming the above-enumerated synthetic high-molecular weight materials may be utilized in order to form the organic primer layer. However, the synthetic high-molecular weight materials for the formation of the organic primer layer should preferably be the materials capable of being crosslinked with irradiation of heat, visible light, UV light, an electron beam, or the like.

In cases where the organic primer layer is formed on the base material layer, in order for the adhesion of the organic primer layer to the base material layer to be enhanced, a coupling agent, such as a silane coupling agent or a titanate coupling agent, should preferably be added to the organic primer layer. Also, such that the coating characteristics of the organic primer layer composition, the vacuum evaporation characteristics of the organic primer layer composition, and the physical properties of the thin film after being hardened may be enhanced, and such that photosensitive properties may be imparted to the coating film, various additives may be contained in the organic primer layer in accordance with the purposes. Examples of the additives include various kinds of polymers and monomers having a hydroxyl group; coloring agents, such as pigments and dyes; stabilizing agents, such as anti-yellowing agents, age resistors, and ultraviolet light absorbers; thermal acid generating agents; photosensitive acid generating agents; surface active agents; solvents; crosslinking agents; hardening agents; and polymerization inhibitors.

Such that the durability may be enhanced, and nonuniformity may be prevented from occurring, the organic primer layer may contain organic powder or inorganic powder. In such cases, the organic powder or the inorganic powder may be contained in a proportion falling within the range of 0.5% by weight to 60% by weight with respect to the weight of the organic primer layer. The powder may exhibit light absorption with respect to the light having wavelengths of a specific wavelength range and may be, for example, ultramarine blue, or the like. However, ordinarily, white powder, which does not exhibit specific light absorption with respect to the light having wavelengths of 300 nm to 900 nm, is preferable. The mean particle diameter of the powder should preferably fall within the range of approximately 0.14 μm to approximately 10 μm, and should more preferably fall within the range of approximately 0.3 μm to approximately 3 μm. Ordinarily, the particles have a certain distribution of the particle size. The distribution of the particle size should preferably be as narrow as possible. In cases where the laminating layer contains organic powder or inorganic powder, the organic powder or the inorganic powder should preferably be set in the same manner as that described above.

The formation of the organic primer layer may be performed with a coating technique or a vacuum evaporation technique. In order for the organic primer layer to have a smooth surface, the vacuum evaporation technique should preferably be employed.

In order for the protective layer to be overlaid on the stimulable phosphor layer, the side of the base material layer or the side of the high-order inorganic layer may be combined with the stimulable phosphor layer in a dry atmosphere by use of the adhesion technique using an adhesive agent or by use of the reduced pressure lamination technique. In such cases, the protective layer should preferably be overlaid on the stimulable phosphor layer with reduced pressure sealing. In cases where the reduced pressure sealing is utilized, peeling of the base material layer or the high-order inorganic layer from the stimulable phosphor layer, particularly under a low atmospheric pressure condition, is capable of being suppressed.

The adhesive agent for adhering the protective layer to the stimulable phosphor layer or for adhering the laminated materials to each other may be selected from a wide variety of adhesive agents. Examples of the adhesive agents include a vinyl type of adhesive agent, an acrylic type of adhesive agent, a polyamide type of adhesive agent, an epoxy type of adhesive agent, a rubber type of adhesive agent, and a urethane type of adhesive agent.

Also, in order for water vapor absorption from side faces of the stimulable phosphor layer to be prevented sufficiently, the side faces of the radiation image-storage panel should preferably be sealed with glass, an epoxy resin, a UV curing resin, or a metal (a solder). Further, in order for deterioration of performance due to water vapor absorption of the stimulable phosphor layer to be prevented from occurring, the operations ranging from the taking of the radiation image storage panel out of a vacuum evaporation tank (i.e., a vacuum evaporation machine) to the sealing of the end faces of the radiation image storage panel should preferably be performed in a vacuum, dry air, an inert gas, or a hydrophobic inert gas.

The stimulable phosphor layer and the substrate of the second radiation image storage panel in accordance with the present invention may be constituted in the same manner as that for the stimulable phosphor layer and the substrate of the first radiation image storage panel in accordance with the present invention.

The second radiation image storage panel in accordance with the present invention will further be illustrated by the following non-limitative examples.

EXAMPLE 4

Formation of Protective Layer

After a 12 μm-thick long PET film acting as a base material film had been set on a feed roll of a vacuum evaporation apparatus, the base material film was conveyed at a predetermined speed, and an aluminum oxide layer acting as the fundamental inorganic layer was vacuum-deposited to a thickness of 10 mm on the PET film by use of a plasma enhanced CVD technique. Thereafter, a silicon oxide layer having a thickness of 240 nm and acting as the first high-order inorganic layer was formed on the aluminum oxide layer acting as the fundamental inorganic layer by use of a film forming process, in which the plasma enhanced CVD technique using an organic silicon compound (hexamethyl disiloxane) was performed while oxygen was being supplied. Also, an aluminum oxide layer acting as the second high-order inorganic layer was vacuum-deposited to a thickness of 10 mm on the silicon oxide layer by use of the plasma enhanced CVD technique. In this manner, a transparent water vapor proof film comprising three inorganic layers having a constitution of aluminum oxide layer—silicon oxide layer—aluminum oxide layer was prepared. The three inorganic layers were overlaid during one time of conveyance of the long base material film at the predetermined speed. The variation of the thickness of each inorganic layer was at most ±30%. An ESCA analysis revealed that carbon atoms were distributed uniformly in the thickness direction of each inorganic layer (carbon atoms: approximately 18 atom %). Further, a water vapor proof film was formed in the same manner as that described above. Thereafter, the thus formed two water vapor proof films were laminated together via a 2.5 μm-thick polyester resin layer, such that the two water vapor proof films took an identical orientation (i.e., such that the inorganic layer surface constitutes one surface side of the combination of the two water vapor proof films). In this manner, a 530 mm-square, 27 μm-thick transparent protective layer (having the layer constitution illustrated in FIG. 10) was obtained.

Adhesion of Protective Layer and Glass Sealing Frame

A soda-lime glass sealing frame (size: 450 mm-square, thickness: 0.5 mm, width: 6 mm, internal corner roundness: 2 mm-diameter) and the inorganic layer surface of the protective layer having been obtained in the manner described above were adhered to each other by use of a two-pack curable epoxy resin (XB5047, XB5067, supplied by Bantico K.K.). At this time, the sealing frame and the protective layer were superposed one upon the other such that the center point of the sealing frame and the center point of the protective layer coincided with each other, and the region of the surface of the protective layer, which region came into contact with the frame surface of the sealing frame, was adhered to the frame surface of the sealing frame. Also, at this time, the two-pack curable epoxy resin was subjected to the curing at a temperature of 40° C. for one day, and the combination of the protective layer and the glass sealing frame adhered to each other was thus obtained.

Formation of Stimulable Phosphor Layer

As a substrate, a soda-lime glass plate having a 450 mm-square size and a thickness of 8 mm was prepared. The soda-lime glass plate had a 5 mm-diameter pressure reducing hole, which was located at a corner region such that the distances between the center point of the pressure reducing hole and two adjacent sides of the soda-lime glass plate were equal to 11 mm. Also, a region of one surface of the soda-lime glass plate, which region was other than a marginal are a (marginal are a width: 8 mm), was provided with an Al evaporated reflecting layer. Masks were then located at the region extending over 8 mm from the periphery on the side of the reflecting layer and at the pressure reducing hole. The soda-lime glass plate was then located within a vacuum evaporation machine such that the surface of the reflecting layer free from the masks might be subjected to vacuum evaporation processing. Thereafter, an $EuBr_2$ tablet and a CsBr tablet were located at a predetermined position within the vacuum evaporation machine, and the vacuum evaporation machine was evacuated to a vacuum of 1.0 Pa. The substrate was then heated with a heater to a temperature of 100° C. Thereafter, the $EuBr_2$ tablet and the CsBr tablet accommodated within a platinum boat were heated. In this manner, a stimulable phosphor (CsBr:Eu) was deposited on the region of the one surface of the substrate, which region was other than the masked regions, to a thickness of 500 μm. In a dry atmosphere, the region in the vacuum evaporation machine was returned to the atmospheric pressure, and the substrate was taken out from the vacuum evaporation machine. It was confirmed that acicular stimulable phosphor crystals having a thickness of approximately 8 μm were densely deposited in an upright orientation on the substrate with a slight spacing from one another.

Sealing of Stimulable Phosphor Layer

The soda-lime glass substrate having been prepared in the manner described above, on which the Al-evaporated reflecting layer had been overlaid, and on which the CsBr:Eu stimulable phosphor had been formed with the vacuum evaporation technique, except for the region for adhesion (extending over 8 mm from the periphery) and the pressure reducing hole, and the transparent protective layer, to which the sealing frame had been adhered, were adhered to each other under pressure by use of an adhesive agent (SU2153-9, supplied by Sunkolec Co., Ltd.). The adhesive agent was then subjected to a curing process at normal temperatures (25° C.) for 12 hours. Further, EDPM rubber was embedded into the pressure reducing hole and adhered to the pressure reducing hole by use of an adhesive agent (SU2153-9), and the pressure reducing hole was thus closed. In this manner, a structure, in which the stimulable phosphor evaporated layer was closed by the substrate, the sealing frame, and the protective layer, was formed.

Pressure Reduction and Sealing with Glass Plug

Thereafter, the EDPM rubber having been embedded in the pressure reducing hole of the closed structure was pierced with an injection needle, and gas was discharged from the closed structure by use of a vacuum pump. The region within the closed structure was thus set in a reduced pressure state. Thereafter, a glass plug, onto which an adhesive agent (SU2153-9) had been applied, was adhered to the EDPM rubber of the pressure reducing hole. In this manner, a radiation image storage panel was obtained.

EXAMPLE 5

An electron beam was irradiated to a metallic aluminum having been put in a crucible, and the metallic aluminum was heated and evaporated. Also, an oxygen-helium mixed gas was introduced through a gas introducing pipe. In this manner, an aluminum oxide layer acting as the fundamental inorganic layer was overlaid to a thickness of 10 nm on a base material layer. After the aluminum oxide layer acting as the fundamental inorganic layer had thus been overlaid on the base material layer, a silicon oxide layer acting as the first high-order inorganic layer was overlaid on the aluminum oxide layer acting as the fundamental inorganic layer with a DC magnetron technique, wherein the pressure was set at an initial vacuum of $3\times10^{-4}$ Pa, wherein a mixed gas of oxygen and an argon gas (9%) was then introduced, and wherein the pressure was thus set at a vacuum of $3\times10^{-1}$ Pa. After the silicon oxide layer acting as the first high-order inorganic layer had thus been overlaid on the aluminum oxide layer acting as the fundamental inorganic layer, an aluminum oxide layer (thickness: 10 nm) acting as the second high-order inorganic layer was overlaid on the silicon oxide layer in the same manner as that for the fundamental inorganic layer described above. Except for the procedures described above, a protective layer was formed in the same manner as that in Example 4. In this manner, a 27 μm-thick transparent protective layer (having the layer constitution illustrated in FIG. 10) was obtained. Thereafter, the adhesion of the protective layer and the glass sealing frame to each other, the formation of the stimulable phosphor layer, the sealing of the stimulable phosphor layer, the pressure reduction, and the sealing with the glass plug were performed in the same manner as that in Example 4. A radiation image storage panel was thus prepared.

EXAMPLE 6

An organic primer layer was overlaid to a thickness of 1.5 μm on a surface of a 12 μm-thick PET layer. Also, in the same manner as that in Example 4, an aluminum oxide layer acting as the fundamental inorganic layer was formed on the organic primer layer. Further, in lieu of the silicon oxide layer, a silicon oxynitride layer acting as the first high-order inorganic layer was overlaid on the aluminum oxide layer acting as the fundamental inorganic layer with a CVD technique. (The second high-order inorganic layer was not formed.) In this manner, a 29 μm-thick transparent protective layer (having the layer constitution illustrated in FIG. 13) was obtained. Thereafter, the adhesion of the protective layer and the glass sealing frame to each other, the formation of the stimulable phosphor layer, the sealing of the stimulable phosphor layer, the pressure reduction, and the sealing with the glass plug were performed in the same manner as that in Example 4. A radiation image storage panel was thus prepared.

EXAMPLE 7

A water vapor proof film was prepared in the same manner as that in Example 4. The surface of the water vapor proof film on the inorganic layer overlaying side and a filler-added CPP layer having a thickness of 30 μm were laminated to each other with the dry lamination technique using a polyurethane type adhesive agent. (The thickness of the laminating layer was 3 μm.) In this manner, a 45 μm-thick transparent protective layer (having the layer constitution illustrated in FIG. 7) was obtained. Also, a stimulable phosphor layer was formed in the same manner as that in Example 4, except that a 43 cm×43 cm square, 2 mm-thick substrate having no pressure reducing hole was utilized. The stimulable phosphor layer was sandwiched between the protective layer and a CPP layer side of an opaque sealing film (i.e., a dry-laminated film having a constitution of 30 μm-thick CPP layer-9 μm-thick aluminum film-188 μm-thick PET layer), such that the stimulable phosphor layer stood facing the protective layer side. Further, the peripheral region of the thus obtained layer combination was subjected was fusion bonded and sealed under reduced pressure by use of an impulse sealer (heater: 3 mm). A radiation image storage panel was thus prepared.

EXAMPLE 8

A radiation image storage panel was prepared in the same manner as that in Example 4, except that a stimulable phosphor layer was formed in the manner described below. Specifically, 2,000 ml of an aqueous BaI solution (3.5N) and 100 ml of an aqueous $EuBr_3$ solution (0.2N) were introduced into a reaction vessel, and the resulting reaction mother liquid was kept at a temperature of 82° C. with stirring. Thereafter, 200 ml of an ammonium fluoride solution (8N) was introduced into the reaction mother liquid by use of a pump, and precipitates were thus formed. After maturing was performed for two hours, the precipitates were collected by filtration, washed with methanol, and dried. In this manner, a BaFI crystal was obtained. After the thus obtained BaFI crystal was uniformly mixed with ultrafine alumina particles, the resulting mixture was filled in a quartz board and fired with a tube furnace under a hydrogen gas atmosphere at a temperature of 825° C. for 1.5 hours. In this manner, europium activated BFI stimulable phosphor particles were obtained. Thereafter, the europium activated BFI stimulable phosphor particles were classified, and the europium activated BFI stimulable phosphor particles having a mean particle diameter of 3 μm were obtained.

Thereafter, 300 g of the europium activated BFI stimulable phosphor particles having been obtained in the manner described above, 11 g of a polyurethane resin, and ¼ g of a bisphenol type epoxy resin were added to a methyl ethyl ketone-toluene mixed solvent, and the resulting mixture was subjected to a dispersing process with a propeller mixer. In this manner, a coating composition for the formation of a stimulable phosphor layer, which coating composition had a viscosity of 25 ps to 30 ps, was prepared. The coating composition for the formation of a stimulable phosphor layer was then applied onto a PET film, which was provided with a priming layer, with a doctor blade coating technique. The thus formed coating layer was dried at a temperature of 100° C. for 15 minutes, and a stimulable phosphor layer having a thickness of 280 μm was formed. The stimulable phosphor layer was slitted to a 45 cm×45 cm square piece, and the obtained piece of the stimulable phosphor layer was used.

EXAMPLE 9

A silicon oxide layer acting as the fundamental inorganic layer was overlaid to a thickness of 10 nm on a 12 μm-thick PET layer by use of an electron beam vacuum evaporation technique. After the silicon oxide layer acting as the fundamental inorganic layer was overlaid on the PET layer, an aluminum oxide layer acting as the first high-order inorganic layer was overlaid to a thickness of 200 nm on the silicon oxide layer acting as the fundamental inorganic layer by use of the electron beam vacuum evaporation technique. Also, after the aluminum oxide layer acting as the first high-order inorganic layer had been overlaid on the silicon oxide layer acting as the fundamental inorganic layer, a silicon oxide layer acting as the second high-order inorganic layer was overlaid to a thickness of 10 nm on the aluminum oxide layer acting as the first high-order inorganic layer by use of the electron beam vacuum evaporation technique. Thereafter, the same procedures as those in Example 4 were performed. In this manner, a 27 μm-thick transparent protective layer (having the layer constitution illustrated in FIG. 12) was obtained. Thereafter, the adhesion of the protective layer and the glass sealing frame to each other, the formation of the stimulable phosphor layer, the sealing of the stimulable phosphor layer, the pressure reduction, and the sealing with the glass plug were performed in the same manner as that in Example 4. A radiation image storage panel was thus prepared.

EXAMPLE 10

An aluminum oxide layer acting as the fundamental inorganic layer was overlaid to a thickness of 20 nm on a 12 μm-thick PET layer by use of a sputtering technique. After the aluminum oxide layer acting as the fundamental inorganic layer was overlaid on the PET layer, a silicon oxide layer acting as the first high-order inorganic layer was overlaid to a thickness of 220 nm on the aluminum oxide layer acting as the fundamental inorganic layer by use of the sputtering technique. Also, after the silicon oxide layer acting as the first high-order inorganic layer had been overlaid on the aluminum oxide layer acting as the fundamental inorganic layer, an aluminum oxide layer acting as the second high-order inorganic layer was overlaid to a thickness of 30 nm on the silicon oxide layer acting as the first high-order inorganic layer by use of the sputtering technique. Thereafter, the same procedures as those in Example 4 were performed. In this manner, a 29 μm-thick transparent protective layer (having the layer constitution illustrated in FIG. 10) was obtained. Thereafter, the adhesion of the protective layer and the glass sealing frame to each other, the formation of the stimulable phosphor layer, the sealing of the stimulable phosphor layer, the pressure reduction, and the sealing with the glass plug were performed in the same manner as that in Example 4. A radiation image storage panel was thus prepared.

EXAMPLE 11

A radiation image storage panel was prepared in the same manner as that in Example 4, except that a 350 nm-thick silicon oxide layer acting as the first high-order inorganic layer was formed with a process, in which a liquid containing tetraalkoxysilane was applied with a wire bar coating technique and hardened.

EXAMPLE 12

A radiation image storage panel was prepared in the same manner as that in Example 11, except that, in lieu of the PET film, a 20 μm-thick polycycloolefin film (Tg=120° C.) was employed as the base material film.

EXAMPLE 13

A radiation image storage panel was prepared in the same manner as that in Example 4, except that, in lieu of the PET film, a film of a PET-PEI nano-alloy polymer having a single glass transition temperature (Tg=115° C.) was employed as the base material film.

EXAMPLE 14

A radiation image storage panel was prepared in the same manner as that in Example 11, except that, in lieu of the PET film, a 12 μm-thick transparent aramid film (Tg=230° C.) was employed as the base material film.

COMPARATIVE EXAMPLE 3

A radiation image storage panel was prepared in the same manner as that in Example 4, except that a protective layer was prepared in the manner described below. Specifically, a silicon oxide layer acting as the transparent inorganic layer was formed to a thickness of 200 nm on a 12 μm-thick PET film by use of the electron beam vacuum evaporation technique, and a water vapor proof film was thus formed. Also, three other water vapor proof films were formed in the same manner. The thus formed four water vapor proof films were overlaid in an identical orientation and laminated with one another by locating a 3 μm-thick transparent polyurethane resin layer between adjacent water vapor proof films. The thus obtained laminate was utilized as the protective layer.

COMPARATIVE EXAMPLE 4

A radiation image storage panel was prepared in the same manner as that in Example 4, except that a protective layer was prepared in the manner described below. Specifically, a silicon oxide layer acting as the transparent inorganic layer was formed to a thickness of 300 nm on a 12 μm-thick PET film by use of the plasma enhanced CVD technique, and a water vapor proof film was thus formed. The thus formed water vapor proof film was utilized as the protective layer.

Evaluation Methods

The radiation image storage panels having been formed in Examples 4 to 14 and Comparative Examples 3 and 4 described above were evaluated with respect to a thickness, a water vapor transmission rate of the protective layer at an ambient temperature of 40° C. and a humidity of 90%, image sharpness, and a light emission lowering rate. The results shown in Table 3 below were obtained. The image sharpness and the light emission lowering rate were measured in the same manner as that described below.

TABLE 3

| | Thickness (μm) | Water vapor transmission rate ($g/m^2/d$) | Image sharpness (%) | Light emission lowering rate (%) |
|---|---|---|---|---|
| Ex. 4 | 27 | 0.04 | 41 | 4 |
| Ex. 5 | 27 | 0.04 | 42 | 5 |
| Ex. 6 | 29 | 0.03 | 40 | 7 |
| Ex. 7 | 45 | 0.07 | 38 | 8 |
| Ex. 8 | 45 | 0.07 | 37 | 6 |
| Ex. 9 | 27 | 0.05 | 41 | 7 |
| Ex. 10 | 29 | 0.04 | 41 | 6 |
| Ex. 11 | 27 | 0.05 | 42 | 7 |
| Ex. 12 | 43 | 0.04 | 39 | 6 |
| Ex. 13 | 27 | 0.03 | 41 | 3 |
| Ex. 14 | 27 | 0.04 | 42 | 6 |
| Comp. Ex. 3 | 57 | 0.10 | 36 | 11 |
| Comp. Ex. 4 | 45 | 0.13 | 39 | 14 |

With each of the radiation image storage panels having been formed in Examples 4 to 14, the protective layer comprises the fundamental inorganic layer and at least one layer of the high-order inorganic layer, which is located on the fundamental inorganic layer, and each high-order inorganic layer is overlaid directly upon an inorganic layer, which is located under each high-order inorganic layer. Therefore, as clear from Table 3, with each of the radiation image storage panels having been formed in Examples 4 to 14, the water vapor transmission rate is capable of being kept lower than the water vapor transmission rates of the radiation image storage panels obtained in Comparative Examples 3 and 4, which do not have the constitution of each of the radiation image storage panels having been formed in Examples 4 to 14.

In each of the radiation image storage panels obtained in Example 12 and Example 14, in lieu of the base material film employed in Example 11, the base material film having a glass transition temperature of at least 100° C. is employed. Each of the radiation image storage panels obtained in Example 12 and Example 14 has a water vapor transmission rate lower than the water vapor transmission rate of the radiation image storage panel obtained in Example 11. Also, each of the radiation image storage panels obtained in Example 12 and Example 14 has a light emission lowering rate, which is lower than the light emission lowering rate of the radiation image storage panel obtained in Example 11. In the radiation image storage panel obtained in Example 13, in lieu of the base material film employed in Example 4, the base material film having a glass transition temperature of at least 100° C. is employed. The radiation image storage panel obtained in Example 13 has a water vapor transmission rate lower than the water vapor transmission rate of the radiation image storage panel obtained in Example 4. Also, the radiation image storage panel obtained in Example 13 has a light emission lowering rate, which is lower than the light emission lowering rate of the radiation image storage panel obtained in Example 4. This is presumably because, in cases where the base material layer having a high glass transition temperature is employed, little deterioration of the base material layer occurs when the base material layer is exposed to high temperatures during the vapor evaporation work, or the like, the water vapor proof characteristics are capable of being kept good, high image sharpness is capable of being obtained, and the light emission lowering rate is capable of being kept low.

As described above, with the second radiation image storage panel in accordance with the present invention, the protective layer comprises the fundamental inorganic layer and at least one layer of the high-order inorganic layer, which is located on the fundamental inorganic layer, and each high-order inorganic layer is overlaid directly upon an inorganic layer, which is located under each high-order inorganic layer. Therefore, the second radiation image storage panel in accordance with the present invention is capable of having a low water vapor transmission rate. Also, in cases where the base material layer having a high glass transition temperature is employed as the base material layer for supporting the inorganic layer of the protective layer, the water vapor transmission rate is capable of being suppressed even further. As a result, the second radiation image storage panel in accordance with the present invention is capable of yielding an image, which has high image sharpness, and suppressing the light emission lowering rate. The second radiation image storage panel in accordance with the present invention is thus capable of yielding an image of good image quality and having high durability.

What is claimed is:

1. A phosphor panel, comprising:

i) a phosphor layer, and ii) a transparent protective film, which comprises at least two layers of a water vapor proof film which are overlaid one upon the other, each comprising a base material film which is a high-molecular weight polymer film and a transparent inorganic layer overlaid on the base material film, wherein the water vapor proof films are located such that the transparent inorganic layer of one of the water vapor proof films is overlaid on a surface of the base material film of the other water vapor proof film, wherein at least one transparent inorganic layer within the transparent protective layer is formed by a vapor deposition method, and wherein the transparent protective film is located such that the transparent inorganic layer of the water vapor proof film stands facing the phosphor layer, such that the phosphor layer is sealed.

2. The phosphor panel as defined in claim 1 wherein the phosphor layer is formed on a substrate, and the transparent protective film is adhered to a surface of the substrate, which surface is opposite to the substrate surface provided with the phosphor layer.

3. The phosphor panel as defined in claim 1 wherein the transparent inorganic layer contains a compound selected from the group consisting of a metal oxide, a metal nitride, and a metal oxynitride.

4. The phosphor panel as defined in claim 1 wherein the transparent protective film has a film thickness of at most 50 μm.

5. The phosphor panel as defined in claim 1 wherein the sealing is performed with adhesion of the transparent protective film by use of a resin, which is capable of being cured at a temperature lower than 100° C.

6. The phosphor panel as defined in claim 5 wherein the resin has a water vapor transmission coefficient of at most 50 $g \cdot mm/(m^2 \cdot d)$.

7. The phosphor panel, as defined in claim 1, wherein the transparent inorganic layer comprises a fundamental inorganic layer and at least one layer of a high-order inorganic layer, which is located on the fundamental inorganic layer, and each high-order inorganic layer is overlaid directly upon an inorganic layer, which is located under each high-order inorganic layer.

8. The phosphor panel as defined in claim 7 wherein at least one layer among high-order inorganic layers has a layer thickness larger than the layer thickness of the fundamental inorganic layer.

9. The phosphor panel as defined in claim 8 wherein the layer thickness of the high-order inorganic layer, which has the layer thickness larger than the layer thickness of the fundamental inorganic layer, falls within the range of 20 nm to 1,000 nm.

10. The phosphor panel as defined in claim 7 wherein at least one set of inorganic layers, which are among the fundamental inorganic layer and high-order inorganic layers and are adjacent to each other, have different crystal structures.

11. The phosphor panel as defined in claim 8 wherein at least one set of inorganic layers, which are among the fundamental inorganic layer and high-order inorganic layers and are adjacent to each other, have different crystal structures.

12. The phosphor panel as defined in claim 7 wherein at least one inorganic layer, which is among the fundamental inorganic layer and high-order inorganic layers, contains a compound selected from the group consisting of a metal oxide, a metal nitride, and a metal oxynitride.

13. The phosphor panel as defined in claim 12 wherein three inorganic layers of the transparent inorganic layer, which inorganic layers are adjacent to one another, are constituted of an aluminum oxide layer, a silicon oxide layer, and an aluminum oxide layer, which are overlaid in this order.

14. The phosphor panel as defined in claim 7 wherein the transparent inorganic layer has a layer thickness of at most 50 μm and a water vapor transmission rate of at most 0.07 $g/m^2/24$ h at 40° C.

15. The phosphor panel as defined in claim 7 wherein the fundamental inorganic layer is formed by a dry process method selected from the group consisting of CVD, PVD and sputtering; and at least one high order inorganic layer is formed by a sol gel wet process method.

16. The phosphor panel as defined in claim 1 wherein the base material layer has a glass transition temperature (Tg) of at least 85° C.

* * * * *